United States Patent
Nagano et al.

(10) Patent No.: US 8,173,753 B2
(45) Date of Patent: May 8, 2012

(54) METHOD FOR PRODUCING ALIPHATIC POLYESTER RESIN, AND AN ALIPHATIC POLYESTER RESIN COMPOSITION

(75) Inventors: Tatsuya Nagano, Nagoya (JP); Tomoko Nasuno, Nagoya (JP); Hiroyuki Ome, Nagoya (JP); Yong He, Shanghai (CN); Bo Yu, Shanghai (CN); Kexin Zhu, Shanghai (CN); Xiao Guo, Shanghai (CN); Pujing Zuo, Shanghai (CN)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 12/991,715

(22) PCT Filed: May 19, 2009

(86) PCT No.: PCT/JP2009/059177
§ 371 (c)(1),
(2), (4) Date: Nov. 29, 2010

(87) PCT Pub. No.: WO2009/142196
PCT Pub. Date: Nov. 26, 2009

(65) Prior Publication Data
US 2011/0065871 A1    Mar. 17, 2011

(30) Foreign Application Priority Data

May 21, 2008  (CN) .......................... 2008 1 0024944
Feb. 13, 2009 (CN) .......................... 2009 1 0025002
Feb. 13, 2009 (JP) ................................ 2009-032001
Feb. 16, 2009 (CN) .......................... 2009 1 0004176

(51) Int. Cl.
*C08G 63/91* (2006.01)

(52) U.S. Cl. ........ 525/415; 525/410; 525/418; 525/437; 525/450; 525/419; 502/168

(58) Field of Classification Search ............... 525/410, 525/411, 415, 437, 450, 418; 502/168
See application file for complete search history.

(56) References Cited

U.S. PATENT DOCUMENTS

| | | | | | |
|---|---|---|---|---|---|
| 5,417,266 | A | * | 5/1995 | Janus | 152/200 |
| 5,726,220 | A | * | 3/1998 | Tokushige et al. | 523/125 |
| 6,140,458 | A | * | 10/2000 | Terado et al. | 528/272 |
| 6,528,617 | B1 | * | 3/2003 | Terado et al. | 528/480 |
| 2003/0008927 | A1 | | 1/2003 | Fuertes et al. | |
| 2009/0176963 | A1 | | 7/2009 | Abiko et al. | |

FOREIGN PATENT DOCUMENTS

| | | |
|---|---|---|
| JP | 8-183840 A | 7/1996 |
| JP | 2000-297143 A | 10/2000 |
| JP | 2000-297145 A | 10/2000 |
| JP | 2000-302852 A | 10/2000 |
| JP | 2001-192443 A | 7/2001 |
| JP | 2001-192444 A | 7/2001 |
| JP | 2001-192445 A | 7/2001 |
| JP | 2001-192446 A | 7/2001 |
| JP | 2003-519111 T | 6/2003 |
| JP | 2004-043722 A | 2/2004 |
| JP | 2008-260893 A | 10/2008 |
| WO | 2007/145195 A1 | 12/2007 |

OTHER PUBLICATIONS

Moon, S.I.; Lee, C.W.; Taniguchi, M.; Miyamoto, M.; Kimura, Y.; Polymer, 2001(42), p. 5059-5062.*

* cited by examiner

*Primary Examiner* — David W Wu
*Assistant Examiner* — Robert Jones, Jr.
(74) *Attorney, Agent, or Firm* — DLA Piper LLP (US)

(57) ABSTRACT

A method for producing an aliphatic polyester resin including a melt polymerization step and a subsequent solid phase polymerization step, using a sulfonic acid group-containing compound as a catalyst, wherein the addition amount of the sulfonic acid group-containing compound during melt polymerization is 300 to 3000 ppm with respect to a raw material monomer calculated as sulfur atoms, the content of the sulfonic acid group-containing compound during melt polymerization is 300 to 3000 ppm with respect to a produced polymer calculated as sulfer atoms, and a residual rate of the sulfonic acid group-containing compound after solid phase at polymerization is more than 50.

13 Claims, No Drawings

METHOD FOR PRODUCING ALIPHATIC POLYESTER RESIN, AND AN ALIPHATIC POLYESTER RESIN COMPOSITION

RELATED APPLICATIONS

This is a §371 of International Application No. PCT/JP2009/059177, with an international filing date of May 19, 2009 (WO 2009/142196 A1, published Nov. 26, 2009), which is based on Chinese Patent Application Nos. 2008 10024944.7, filed May 21, 2008, and 2009 10025002.5, filed Feb. 13, 2009, Japanese Patent Application No. 2009-032001, filed Feb. 13, 2009, and Chinese Patent Application No. 2009 10004176.3, filed Feb. 16, 2009, the subject matter of which is incorporated by reference.

TECHNICAL FIELD

This disclosure relates to a method for effectively producing an aliphatic polyester resin having a high molecular weight and, in the preferred state, a high melting point and excellent thermal stability and hue.

BACKGROUND

In recent years, from a viewpoint of environmental protection, an aliphatic polyester resin using a plant as a raw material has been paid an attention and, particularly, as a carbon neutral material derived from a plant, a polylactic acid resin has been paid an attention. The polylactic acid resin has a high melting point of about 170° C., and can be subjected to melt molding process and, further, since lactic acid which is a monomer is able to be produced by a fermentation method utilizing a microorganism at low cost, the polylactic acid resin is expected as a biomass plastic which can substitute a commodity plastic derived from a petroleum raw material, and is being gradually used. As a main method for producing the polylactic acid resin, there are a ring opening polymerization method of performing ring opening and polymerization of a lactide which is a dimer of lactic acid, and a direct polycondensation method of performing dehydration-polycondensation using lactic acid. Since the direct polycondensation method can directly use lactic acid as a polymerization raw material without via a step of synthesizing a lactide, it is said that the method can produce a polylactic acid resin at low cost, as compared with the ring opening polymerization method. JP-A No. 8-183840, JP-A No. 2000-297145, JP-A No. 2000-297143, JP-A No. 2000-302852, WO 07/145,195 and JP-A No. 2008-260893 disclose a method for producing a polylactic acid resin using, as a catalyst, a volatile organic sulfonic acid compound such as methanesulfonic acid, p-toluenesulfonic acid and trifluoromethanesulfonic acid, but when these catalysts are used, since the catalysts are vaporized during polymerization, they do not effectively work as a catalyst, a polymerization time is long, and there was a problem in productivity. In addition, WO 07/145,195 discloses an organic sulfonic acid metal salt, but since the form is a metal salt, it does not effectively work as sulfonic acid, and since it becomes to contain a large amount of metal, there was a problem of productivity, and thermal stability of the resulting polymer.

It would therefore be helpful to provide a method for effectively producing an aliphatic polyester resin having a high molecular weight and, in the preferred state, a high melting point and excellent thermal stability and hue.

SUMMARY

We discovered a method for effectively producing an aliphatic polyester resin having a high molecular weight and, in the preferred state, a high melting point and excellent thermal stability and hue.

That is, we provide:

(1) A method for producing an aliphatic polyester resin using a sulfonic acid group-containing compound as a catalyst, including a melt polymerization step, and a subsequent solid phase polymerization step, wherein the addition amount of the sulfonic acid group-containing compound during melt polymerization is 300 to 3000 ppm with respect to a raw material monomer calculated as sulfer atoms, the content of the sulfonic acid group-containing compound after solid phase polymerization is 300 to 3000 ppm with respect to a produced polymer calculated as sulfer atoms, and a residual rate of the sulfonic acid group-containing compound after solid phase polymerization is more than 50%;

(2) The method for producing an aliphatic polyester resin according to (1), wherein the content of the sulfonic acid group-containing compound after solid phase polymerization is 300 to 3000 ppm with respect to a produced polymer calculated as sulfer atoms, and a residual rate of the sulfonic acid group-containing compound after solid phase polymerization is 80% or more;

(3) The method for producing an aliphatic polyester resin according to (1), wherein the sulfonic acid group-containing compound has 2 or more sulfonic acid groups in one molecule;

(4) The method for producing an aliphatic polyester resin according to (3), wherein the sulfonic acid group-containing compound having 2 or more sulfonic acid groups in one molecule is one or more kinds selected from methanedisulfonic acid, ethanedisulfonic acid, propanedisulfonic acid, butanedisulfonic acid, benzenedisulfonic acid, naphthalenedisulfonic acid, biphenyldisulfonic acid, phenoldisulfonic acid, catecholdisulfonic acid, benzidinedisulfonic acid, naphtholdisulfonic acid, and benzenetrisulfonic acid;

(5) The method for producing an aliphatic polyester resin according to (1), wherein the sulfonic acid group-containing compound is added at any stage from before initiation of the melt polymerization step to before initiation of the solid phase polymerization step;

(6) The method for producing an aliphatic polyester resin according to (1), wherein one or more kinds of compounds selected from a nitrogen-containing organic compound, an alkali metal compound, and an alkaline earth metal compound are further added;

(7) The method for producing an aliphatic polyester resin according to (6), wherein the nitrogen-containing organic compound is one or more kinds selected from an aromatic amine compound, an alkylamine compound having 4 or more carbon atoms, and a compound having a pyrimidine skeleton, the alkali metal compound is one or more kinds selected from an organic carboxylic acid alkali metal compound having 4 or more carbon atoms, and the alkaline earth metal compound is one or more kinds selected from an organic carboxylic acid alkaline earth metal compound having 4 or more carbon atoms;

(8) The method for producing an aliphatic polyester resin according (6), wherein one or more kinds of compounds selected from the nitrogen-containing organic compound, the alkali metal compound and the alkaline earth metal compound are added after addition of the sulfonic acid group-containing compound;

(9) The method for producing an aliphatic polyester resin according to (1), wherein one or more kinds of metal compounds selected from a tin compound, a titanium compound, a lead compound, a zinc compound, a cobalt compound, an iron compound, a lithium compound, and a rare earth compound are further added;

(10) The method for producing an aliphatic polyester resin according to (9), wherein the ratio of a sulfur atom molar amount of the sulfonic acid group-containing compound with respect to a total metal molar amount of the tin compound, the titanium compound, the lead compound, the zinc compound, the cobalt compound, the iron compound, the lithium compound, and the rare earth compound after solid phase polymerization is 3.0 to 50;

(11) The method for producing an aliphatic polyester resin according to (1), wherein the melt polymerization step is continuously performed under a condition including at least the following 2 stages, and the solid phase polymerization step is continuously performed under the condition including at least the following 2 stages:
Melt polymerization step Condition 1 140° C. to 160° C., 13.3 to 66.6 kPa
Condition 2 160° C. to 180° C., 1.3 to 6.5 kPa
Solid phase polymerization step Condition 1 130° C. to 150° C.
Condition 2 higher than 150° C. to 165° C.;

(12) The method for producing an aliphatic polyester resin according to (1), wherein a stabilizer is added at any stage from before initiation of the melt polymerization step to after completion of the solid phase polymerization step;

(13) The method for producing an aliphatic polyester resin according to (1), wherein each polymerization reaction of the melt polymerization step and the solid phase polymerization step is performed by a continuous method;

(14) The method for producing an aliphatic polyester resin according to (1), wherein the aliphatic polyester resin is a polylactic acid-based resin;

(15) An aliphatic polyester resin composition containing a sulfonic acid group-containing compound having 2 or more sulfonic acid groups in one molecule, in an aliphatic polyester, in a content of 300 to 3000 ppm with respect to a produced polymer calculated as sulfer atoms;

(16) The aliphatic polyester resin composition according to (15), wherein the sulfonic acid group-containing compound having 2 or more sulfonic acid groups in one molecule is one or more kinds selected from methanedisulfonic acid, ethanedisulfonic acid, propanedisulfonic acid, butanedisulfonic acid, benzenedisulfonic acid, naphthalenedisulfonic acid, biphenyldisulfonic acid, phenoldisulfonic acid, catecholdisulfonic acid, benzidinedisulfonic acid, naphtholdisulfonic acid, and benzenetrisulfonic acid;

(17) The aliphatic polyester resin composition according to (15), further containing one or more kinds of compounds selected from a nitrogen-containing organic compound, an alkali metal compound, and an alkaline earth metal compound;

(18) The aliphatic polyester resin composition according to (17), wherein the ratio of a nitrogen atom molar amount of the nitrogen-containing organic compound with respect to a sulfur atom molar amount of the sulfonic acid group-containing compound having 2 or more sulfonic acid groups in one molecule is 0.3 to 3.3;

(19) The aliphatic polyester resin composition according to (15), wherein a weight average molecular weight is 100000 or more, the ratio of a weight average molecular weight with respect to a number average molecular weight is 1.4 to 3, and a weight loss rate when retained at 200° C. for 20 minutes under a nitrogen stream is 0.6% or less; and

(20) The aliphatic polyester resin composition according to (15), wherein the aliphatic polyester resin is a polylactic acid-based resin.

An aliphatic polyester resin having a high molecular weight and, in the preferred state, a high melting point, and excellent thermal stability and hue can be effectively produced.

DETAILED DESCRIPTION

The aliphatic polyester resin is a polymer having a fundamental constituent unit consisting of an ester bond and an aliphatic group, and examples of a component unit include an aliphatic polyvalent carboxylic acid, an aliphatic polyhydric alcohol, aliphatic hydroxycarboxylic acid, and aliphatic lactone, specifically, aliphatic polyvalent carboxylic acids such as succinic acid, adipic acid, sebacic acid, and fumaric acid, or derivatives thereof, aliphatic polyhydric alcohols such as ethylene glycol, propylene glycol, butanediol, hexanediol, octanediol, neopentyl glycol, glycerin, isosorbide, trimethylolpropane, pentaerythritol, an aliphatic polyvalent alcohol in which ethylene oxide or propylene oxide is added to trimethylolpropane or pentaerythritol, diethylene glycol, triethylene glycol, polyethylene glycol, and polypropylene glycol, or derivatives thereof, aliphatic hydroxycarboxylic acids such as lactic acid, citric acid, malic acid, glycolic acid, 3-hydroxybutyric acid, 4-hydroxybutyric acid, 4-hydroxyvaleric acid, and 6-hydroxycaproic acid, and aliphatic lactones such as glycolide, ε-caprolactone, ε-caprolactone, β-propiolactone, δ-butyrolactone, β- or γ-butyrolactone, pivalolactone, and δ-valerolactone. A plurality of kinds of component units may be copolymerized and, from a viewpoint of physical properties such as a melting point, it is preferable that 50 mole % or more of all component units is occupied by 2 or less kinds of component units.

As the aliphatic polyester resin, a polylactic acid-based resin which is a polymer containing, as a main component, L-lactic acid and/or D-lactic acid, among the above-listed component units, is preferable from a viewpoint of high molecular weight and a high melting point. In addition, when L-lactic acid is a main component, the resin is called poly-L-lactic acid and, when D-lactic acid is a main component, the resin is called poly-D-lactic acid.

When the polylactic acid-based resin is poly-L-lactic acid, the resin contains an L-lactic acid unit preferably in a content of 70 mole % or more, preferably 80 mole % or more, more preferably 90 mole % or more, further preferably 95 mole % or more, particularly preferably 98 mole % or more.

When the polylactic acid-based resin is poly-D-lactic acid, the resin contains a D-lactic acid unit preferably in a content of 70 mole % or more, preferably 80 mole % or more, more preferably 90 mole % or more, further preferably 95 mole % or more, particularly preferably 98 mole % or more.

Upon production of the polylactic acid-based resin by direct polycondensation, it is preferable to use, as a main raw material, high purity lactic acid in which, as impurities in a 90% aqueous lactic acid solution, total alcohols are 70 ppm or less, and total organic acids are 800 ppm or less, total aldehydes are 50 ppm or less, and total esters are 400 ppm or less.

Optical purity of lactic acid used is preferably 95% or more, further preferably 98% or more, particularly preferably 99% or more. When lactic acid is L-lactic acid, the content of D-lactic acid is preferably 2.5% or less, further preferably 1% or less, particularly preferably 0.5% or less. When lactic acid is D-lactic acid, the content of L-lactic acid is preferably 2.5% or less, further preferably 1% or less, particularly preferably 0.5% or less.

In addition, it is also preferable that the polylactic acid-based resin is a polylactic acid stereo-complex consisting of poly-L-lactic acid and poly-D-lactic acid, and is also preferable that the polylactic acid-based resin is a block copolymer consisting of poly-L-lactic acid and poly-D-lactic acid.

Other component units may be contained in such a range that performance of the aliphatic polyester resin is not deteriorated. Specifically, examples include aromatic polyvalent carboxylic acids such as terephthalic acid, isophthalic acid, 2,6-naphthalenedicarboxylic acid, 5-sodiumsulfoisophthalic acid, and 5-tetrabutylphosphonium sulfoisophthalic acid, or derivatives thereof, and aromatic polyhydric alcohols such as compound obtained by addition-reacting bisphenol with ethylene oxide.

The method for producing the aliphatic polyester contains a melt polymerization step and a subsequent solid phase polymerization step, using a sulfonic acid group-containing compound as a catalyst. The sulfonic acid group-containing compound referred herein is an acidic compound having the proton producing ability.

First, the melt polymerization step will be explained. As a catalyst, the sulfonic acid group-containing compound is used. As the sulfonic acid group-containing compound, any can be used as far as a residual rate after solid phase polymerization defined below is more than 50% and, preferably, a sulfonic acid group-containing compound having a boiling point of 200° C. or higher or a melting point of 160° C. or higher at a atmospheric pressure can be used. Further preferable is a sulfonic acid group-containing compound having a melting point of 180° C. or higher. Specific examples are aromatic sulfonic acids such as n-butylbenzenesulfonic acid, n-octylbenzenesulfonic acid, n-dodecylbenzenesulfonic acid, pentadecylbenzenesulfonic acid, 2,5-dimethylbenzenesulfonic acid, 2,5-dibutylbenzenesulfonic acid, o-aminobenzenesulfonic acid, m-aminobenzenesulfonic acid, p-aminobenzenesulfonic acid, 3-amino-4-hydroxybenzenesulfonic acid, 5-amino-2-methylbenzenesulfonic acid, 3,5-diamino-2,4,6-trimethylbenzenesulfonic acid, 2,4-dinitrobenzenesulfonic acid, 2,5-dichlorobenzenesulfonic acid, p-phenolsulfonic acid, cumenesulfonic acid, xylenesulfonic acid, o-cresolsulfonic acid, m-cresolsulfonic acid, p-cresol-sulfonic acid, 2-naphthalenesulfonic acid, 1-naphthalenesulfonic acid, isopropylnaphthalenesulfonic acid, dodecylnaphthalenesulfonic acid, dinonylnaphthalenesulfonic acid, dinonylnaphthalenedisulfonic acid, 1,5-naphthalenedisulfonic acid, 1,6-naphthalenedisulfonic acid, 2,6-naphthalenedisulfonic acid, 2,7-naphthalenedisulfonic acid, 1,3,6-naphthalenetrisulfonic acid, 4,4-biphenyldisulfonic acid, anthraquinone-2-sulfonic acid, o-benzenedisulfonic acid, m-benzenedisulfonic acid, p-benzenedisulfonic acid, 2,5-diamino-1,3-benzenedisulfonic acid, phenol-2,4-disulfonic acid, aniline-2,4-disulfonic acid, anthraquinone-1,5-disulfonic acid, benzidinedisulfonic acid, 1-naphthol-2-sulfonic acid, 2-naphthol-3,6-disulfonic acid, 2-naphthol-6,8-disulfonic acid, 1,3,5-benzenetrisulfonic acid, and polystyrenesulfonic acid, and aliphatic sulfonic acids and alicyclic sulfonic acids such as n-octylsulfonic acid, pentadecylsulfonic acid, 1,2-ethanedisulfonic acid, 1,3-propanedisulfonic acid, methanedisulfonic acid, 1,4-butane-disulfonic acid, pentanedisulfonic acid, hexanedisulfonic acid, heptanedisulfonic acid, octane-disulfonic acid, nonanedisulfonic acid, decanedisulfonic acid, 1,11-undecanedisulfonic acid, 1,12-dodecanedisulfonic acid, catechol-3,5-disulfonic acid, cyclopentanesulfonic acid, cyclohexanesulfonic acid and camphorsulfonic acid, and taurine.

A sulfonic acid group-containing compound having 2 or more sulfonic acids groups in one molecule, particularly, a disulfonic acid compound or a polyvalent sulfonic acid compound is preferable in that an aliphatic polyester resin having a high molecular weight or a high melting point and, particularly, excellent thermal stability can be obtained.

As the sulfonic acid group-containing compound having 2 or more sulfonic acid groups in one molecule, there are aromatic disulfone and aromatic polyvalent sulfonic acid and, specifically, examples include dinonylnaphthalenedisulfonic acid, 1,5-naphthalenedisulfonic acid, 1,6-naphthalenedisulfonic acid, 2,6-naphthalenedisulfonic acid, 2,7-naphthalenedisulfonic acid, 1,3,6-naphthalenetrisulfonic acid, 4,4-biphenyldisulfonic acid, o-benzenedisulfonic acid, m-benzenedisulfonic acid, p-benzenedisulfonic acid, 2,5-diamino-1,3-benzenedisulfonic acid, phenol-2,4-disulfonic acid, aniline-2,4-disulfonic acid, anthraquinone-1,5-disulfonic acid, benzidinedisulfonic acid, 2-naphthol-3,6-disulfonic acid, 2-naphthol-6,8-disulfonic acid, 1,3,5-benzenetrisulfonic acid, and polystyrenesulfonic acid.

Examples of the sulfonic acid group-containing compound having 2 or more sulfonic acid groups in one molecule include aliphatic disulfonic acid represented by a molecular formula $HO_3S—R—SO_3H$, wherein R is C1-C20 alkylene (C represents carbon, Cn represents a carbon number of n, the same hereinafter), C1-C20 alkylidene, C3-C20 cycloalkylidene, C3-C20 alkenylene, a C4-C20 alkynylene group, a C1-C20 substituted alkylidene group, a C3-C20 substituted cycloalkylidene group, a C3-C20 substituted alkenylene or a C4-C20 substituted alkynylene group. Specifically, R is methylene, ethylene, linear or branched chain propylene, linear or branched chain butylene, linear or branched chain pentamethylene, linear or branched chain hexylidene, linear or branched chain heptylidene, linear or branched chain octenyl, linear or branched chain —$C_9H_{18}$—, linear or branched chain —$C_{10}H_{20}$—, linear or branched chain —$C_{11}H_{22}$—, linear or branched chain —$C_{12}H_{24}$—, linear or branched chain —$C_{13}H_{26}$—, linear or branched chain —$C_{10}H_{20}$—, linear or branched chain —$C_{10}H_{20}$—, linear or branched chain —$C_{10}H_{20}$—, linear or branched chain —$C_{14}H_{28}$—, linear or branched chain —$C_{15}H_{30}$—, linear or branched chain —$C_{18}H_{36}$—, or linear or branched chain —$C_{20}H_{40}$—. R may be a substituted alkylidene group containing at least an alkyl group, a naphthene group, an amino group, a hydroxy group, alkoxy, a carboxyl group, an ester group, an aldehyde group, an amido group, a nitrile group, a nitro group and a halogen group, R may be a C3-C20 cycloalkylidene group or a substituted cycloalkylidene group, or R may be C3-C20 alkenylene in which an ethylene bond is situated at an optional position, or C3-C20 alkenylene in which a substituted ethylene bond is situated at an optional position. R may be also a C4-C20 substituted alkynylene group in which an acetal bond is situated at an optional position or a C4-C20 substituted alkynylene group in which a substituted acetal bond is situated at an optional position.

Specific examples of the aliphatic disulfonic acid include methanedisulfonic acid, ethanedisulfonic acid, propiondisulfonic acid, butanedisulfonic acid, pentanedisulfonic acid, hexanedisulfonic acid, heptanedisulfonic acid, octanedisulfonic acid, nonanedisulfonic acid, decanedisulfonic acid, 1,11-undecanedisulfonic acid and 1,12-dodecanedisulfonic acid.

As the sulfonic acid group-containing compound, methanedisulfonic acid, ethanedisulfonic acid, propanedisulfonic acid, butanedisulfonic acid, benzenedisulfonic acid, naphthalenedisulfonic acid, biphenyldisulfonic acid, phenoldisulfonic acid, catecholdisulfonic acid, benzidinedisulfonic acid, naphtholdisulfonic acid, and benzenetrisulfonic acid are particularly preferable. In addition, the sulfonic acid group-containing compound may be used alone, or two or more kinds may be used together.

The amount of the sulfonic acid group-containing compound of a catalyst used in the melt polymerization step is 300 to 3000 ppm, more preferably 350 to 2700 ppm, further preferably 400 to 2500 ppm, particularly preferably 450 to 2200 ppm calculated as sulfer atoms, with respect to a raw material (L-lactic acid and/or D-lactic acid and the like) used, in that the aliphatic polyester resin having a high molecular weight and a high melting point can be effectively obtained.

In addition, as other catalyst, a metal catalyst, and an acid catalyst other than the sulfonic acid group-containing compound can be added in such a range that the effect of our method is not deteriorated. Examples of the metal catalyst include metal compounds such as tin compounds, titanium compounds, lead compounds, zinc compounds, cobalt compounds, iron compounds, lithium compounds, and rare earth compounds and, as a kind of the compounds, metal alkoxide, metal halide, organic carboxylate, carbonate, sulfate, and oxide are preferable. Specifically, examples include tin compounds such as a tin powder, tin (II) chloride, tin (IV) chloride, tin (II) bromide, tin (IV) bromide, ethoxytin (II), t-butoxytin (IV), isopropoxytin (IV), tin (II) acetate, tin (IV) acetate, tin (II) octylate, tin (II) laurate, tin (II) myristate, tin (II) palmitate, tin (II) stearate, tin (II) oleate, tin (II) linolate, acetylacetone tin (II), tin (II) oxalate, tin (II) lactate, tin (II) tartarate, tin (II) pyrophosphate, tin (II) p-phenolsulfonate, tin (II) bis(methanesulfonate), tin (II) sulfate, tin (II) oxide, tin (IV) oxide, tin (II) sulfide, tin (IV) sulfide, dimethyltin (IV) oxide, methylphenyltin (IV) oxide, dibutyltin (IV) oxide, dioctyltin (IV) oxide, diphenyltin (IV) oxide, tributyltin oxide, triethyltin (IV) hydroxide, triphenyltin (IV) hydroxide, tributyltin hydride, monobutyltin (IV) oxide, tetramethyltin (IV), tetraethyltin (IV), tetrabutyltin (IV), dibutyldiphenyltin (IV), tetraphenyltin (IV), tributyltin (IV) acetate, triisobutyltin (IV) acetate, triphenyltin (IV) acetate, dibutyltin diacetate, dibutyltin dioctanoate, dibutyltin (IV) dilaurate, dibutyltin (IV) maleate, dibutyltin bis(acetylacetonate), tributyltin (IV) chloride, dibutyltin dichloride, monobutyltin trichloride, dioctyltin dichloride, triphenyltin (IV) chloride, tributyltin sulfide, tributyltin sulphate, tin (II) trifluoromethanesulfonate, ammonium hexachlorostannate, dibutyltin sulfide, diphenyltin sulfide, triethyltin sulfate and phthalocyanine tin (II) and, among them, tin compounds other than tin (II) chloride are preferable.

In addition, examples include titanium compounds such as titanium methoxide, titanium propoxide, titanium isopropoxide, titanium butoxide, titanium isobutoxide, titanium cyclohexide, titanium phenoxide, titanium chloride, titanium diacetate, titanium triacetate, titanium tetraacetate, and titanium (IV) oxide, lead compounds such as diisopropoxylead (II), lead monochloride, lead acetate, lead (II) octylate, lead (II) isooctanoate, lead (II) isononanate, lead (II) laurate, lead (II) oleate, lead (II) linolate, lead naphthenate, lead (II) neodecanoate, lead oxide, and lead (II) sulfate, zinc compounds such as zinc powder, methylpropoxyzinc, zinc chloride, zinc acetate, zinc (II) octylate, zinc naphthenate, zinc carbonate, zinc oxide, and zinc sulfate, cobalt compounds such as cobalt chloride, cobalt acetate, cobalt (II) octylate, cobalt (II) isooctanoate, cobalt (II) isononanate, cobalt (II) laurate, cobalt (II) oleate, cobalt (II) linolate, cobalt naphthenate, cobalt (II) neodecanoate, cobalt (II) carbonate, cobalt (II) sulfate, and cobalt (II) oxide, iron compounds such as iron (II) chloride, iron (II) acetate, iron (II) octylate, iron naphthenate, iron (II) carbonate, iron (II) sulfate, and iron (II) oxide, lithium compounds such as propoxylithium, lithium chloride, lithium acetate, lithium octylate, lithium naphthenate, lithium carbonate, dilithium sulfate, and lithium oxide, and rare earth compounds such as triisopropoxyeuropium (III), triisopropoxyneodymium (III), triisopropoxylanthanum, triisopropoxy-samarium (III), triisopropoxyyttrium, isopropoxyyttrium, dysprosium chloride, europium chloride, lanthanum chloride, neodymium chloride, samarium chloride, yttrium chloride, dysprosium (III) triacetate, europium (III) triacetate, lanthanum acetate, neodymium triacetate, samarium acetate, yttrium triacetate, dysprosium (III) carbonate, dysprosium (IV) carbonate, europium (II) carbonate, lanthanum carbonate, neodymium carbonate, samarium (II) carbonate, samarium (III) carbonate, yttrium carbonate, dysprosium sulfate, europium (II) sulfate, lanthanum sulfate, neodymium sulfate, samarium sulfate, yttrium sulfate, europium dioxide, lanthanum oxide, neodymium oxide, samarium (III) oxide, and yttrium oxide.

Besides, examples include potassium compounds such as potassium isopropoxide, potassium chloride, potassium acetate, potassium octylate, potassium naphthenate, tert-butyl potassium carbonate, potassium sulfate, and potassium oxide, copper compounds such as copper (II) diisopropoxide, copper (II) chloride, copper (II) acetate, copper octylate, copper naphthenate, copper (II) sulfate, and dicopper carbonate, nickel compounds such as nickel chloride, nickel acetate, nickel octylate, nickel carbonate, nickel (II) sulfate, and nickel oxide, zirconium compounds such as tetraisopropoxyzirconium (IV), zirconium trichloride, zirconium acetate, zirconium octylate, zirconium naphthenate, zirconium (II) carbonate, zirconium (IV) carbonate, zirconium sulfate, and zirconium (II) oxide, antimony compounds such as triisopropoxy-antimony, antimony (III) fluoride, antimony (V) fluoride, antimony acetate, and antimony (III) oxide, magnesium compounds such as magnesium diisopropoxide, magnesium chloride, magnesium acetate, magnesium lactate, magnesium carbonate, magnesium sulfate, and magnesium oxide, calcium compounds such as diisopropoxycalcium, calcium chloride, calcium acetate, calcium octylate, calcium naphthenate, calcium lactate, and calcium sulfate, aluminum compounds such as aluminum, aluminum isopropoxide, aluminum chloride, aluminum acetate, aluminum octylate, aluminum sulfate, and aluminum oxide, germanium compounds such as germanium, tetraisopropoxygermane, and germanium (IV) oxide, manganese compounds such as triisopropoxymanganese (III), manganese trichloride, manganese acetate, manganese (II) octylate, manganese (II) naphthenate, and manganese (II) sulfate, bismuth compounds such as bismuth (III) chloride, bismuth powder, bismuth (III) oxide, bismuth acetate, bismuth octylate, and bismuth neodecanoate. In addition, compounds consisting of two or more kinds of metal elements such as sodium stannate, magnesium stannate, potassium stannate, calcium stannate, manganese stannate, bismuth stannate, barium stannate, strontium stannate, sodium titanate, magnesium titanate, aluminum titanate, potassium titanate, calcium titanate, cobalt titanate, zinc titanate, manganese titanate, zirconium titanate, bismuth titanate, barium titanate, and strontium titanate are also preferable.

In addition, the acid catalyst other than the sulfonic acid group-containing compound may be a Brönsted acid which is a proton donor, or a Lewis acid which is an electron pair acceptor, and may be either of an organic acid or an inorganic acid. Examples include monocarboxylic acid compounds such as formic acid, acetic acid, propionic acid, heptanoic acid, octanoic acid, octylic acid, nonanoic acid, isononanoic acid, trifluoroacetic acid and trichloroacetic acid, dicarboxylic acid compounds such as oxylic acid, succinic acid, maleic acid, tartaric acid and malonic acid, tricarboxylic acid compounds such as citric acid and tricarballylic acid, acidic amino acids such as aspartic acid and glutamic acid, ascorbic acid, retinoic acid, phosphoric acid, metaphosphoric acid, phosphorous acid, hypophosphorous acid, polyphosphoric acid, phosphoric acid monoester such as monododecyl phosphate and monooctadecyl phosphate, phosphoric acid diester such as didodecyl phosphate and dioctadecyl phosphate, phosphoric acid compounds such as phosphorous acid monoester and phosphorous acid diester, boric acid, hydrochloric acid, and sulfuric acid. In addition, the acid catalyst other than the sulfonic acid group-containing compound is not particularly limited in a shape, and may be any of a solid acid catalyst and a liquid acid catalyst, and examples of the solid acid catalyst include natural minerals such as acid clay, kaolinite, bentonite, montmorillonite, talc, zirconium silicate and zeolite, oxides such as silica, alumina, titania and zirconia, or oxide complexes such as silica alumina, silica magnesia, silica boria, alumina boria, silica titania and silica zirconia, chlorinated alumina, fluorinated alumina, and cation exchange resin. In addition, when polymerization of the polylactic acid-based resin is performed employing a racemate which is an equivalent mixture of L-lactic acid and D-Lactic acid as a raw material using a catalyst having stereoselective polymerizability, poly-L-lactic acid and poly-D-lactic acid can be also produced simultaneously.

Tin compounds, titanium compounds, lead compounds, zinc compounds, cobalt compounds, iron compounds, lithium compounds, rare earth compounds, antimony compounds, bismuth compounds, and acid catalysts other than the sulfonic acid group-containing compound are preferable in that the aliphatic polyester resin having a high molecular weight and a high melting point can be obtained, tin compounds, titanium compounds, lead compounds, zinc compounds, cobalt compounds, iron compounds, lithium compounds, rare earth compounds, sulfonic acid compounds, and phosphorus compounds are more preferable in that productivity is excellent, and tin compounds, titanium compounds, rare earth compounds, sulfonic acid compounds, and phosphorus compounds are further preferable. In addition, as the metal catalyst, a tin-based organic carboxylate having two ligands is further preferable, and tin (II) acetate or tin (II) octylate is particularly preferable in that the polylactic acid-based resin excellent in thermal stability and hue can be obtained. In addition, two or more kinds can be used together, it is preferable to use one or more kinds selected from tin compounds and one or more kinds selected from sulfonic acid compounds, it is more preferable to use tin (II) acetate and/or tin (II) octylate, and any one or more kinds selected from methanedisulfonic acid, ethanedisulfonic acid, propanedisulfonic acid, butanedisulfonic acid, benzenedisulfonic acid, naphthlenedisulfonic acid, biphenyldisulfonic acid, phenoldisulfonic acid, catecholdisulfonic acid, benzidinedisulfonic acid, naphtholdisulfonic acid, and benzenetrisulfonic acid, and it is further preferable to use tin (II) acetate and/or tin (II) octylate, and any one or more kinds selected from naphtalenedisulfonic acid, propanedisulfonic acid, and biphenyldisulfonic acid.

The addition amount of other catalyst is not particularly limited, but is preferably 0.0001 to 2 parts by weight, more preferably 0.001 to 1 part by weight, further preferably 0.005 to 0.5 part by weight, particularly preferably 0.01 to 0.3 part by weight with respect to 100 parts by weight of the aliphatic polyester resin.

The reaction condition of the melt polymerization step is not particularly limited, but the reaction can be performed under various conditions, may be performed at a one stage or at a multistage of 2 or more stages, may be performed in a batch method, or continuous method, and it is preferable that the melt polymerization step is continuously performed under the condition including at least the following two stages:

Condition 1: 140° C. to 160° C., 13.3 to 66.6 kPa;
Condition 2: 160° C. to 180° C., 1.3 to 6.5 kPa.

The melt polymerization step has a substantial reaction temperature of preferably 120 to 220° C., further preferably 130 to 200° C., particularly preferably 140 to 180° C. in that the aliphatic polyester resin having a high molecular weight can be effectively obtained, and the melt polymerization step is performed at a temperature of preferably 145 to 175° C., more preferably 140 to 170° C. in that the aliphatic polyester resin having a high melting point and excellent hue can be effectively obtained. In addition, a temperature of the melt polymerization step may be at a one or at a multistage of 2 or more stages, and is preferably at a multistage of 2 or more stages in that the polylactic acid-based resin having a high molecular weight and a high melting point can be effectively obtained and, for example, a method of performing a reaction at a temperature of 160 to 180° C. after a reaction at a temperature of 140 to 160° C. is exemplified.

The melt polymerization step is performed at a substantial reaction pressure of preferably 0.13 to 130 kPa in that the aliphatic polyester resin having a high molecular weight can be effectively obtained, and the melt polymerization step is performed at a pressure of preferably 1 to 100 kPa, more preferably 10 to 90 kPa, further preferably 10 to 80 kPa, particularly preferably 20 to 70 kPa in that the aliphatic polyester resin also excellent in hue can be effectively obtained. In addition, a pressure of the melt polymerization may be at a one stage, or at a multistage of 2 or more stages, and is preferably at a multistage of 2 or more stages in that the aliphatic polyester resin can be high-molecularized and is excellent in hue and, for example, a method of performing a reaction at a pressure of 1.3 to 6.5 kPa after a reaction at a pressure of 13.3 to 66.6 kPa is exemplified.

The melt polymerization step is performed for a reaction time of preferably 0.5 to 50 hours, and is performed for a reaction time of preferably 1 to 45 hours, more preferably 2 to 40 hours, further preferably 3 to 35 hours, particularly preferably 4 to 30 hours in that the aliphatic polyester resin also excellent in hue can be effectively obtained. In addition, when a temperature and a pressure of the melt polymerization step are at a multistage of 2 or more stages, for example, a method of performing a reaction at a temperature of 160 to 180° C. and a pressure of 1.3 to 6.5 kPa for a reaction time of 2 to 15 hours after a reaction at a temperature of 140 to 160° C. and a pressure of 13.3 to 66.6 kPa for a reaction time of 2 to 15 hours is exemplified. In addition, even when a temperature and a pressure are at a multistage of 2 or more stages, a total reaction time of the melt polymerization step is preferably 0.5 to 50 hours.

The melt polymerization step may be conducted by a batch method or a continuous method and, in the case of a batch method, a time until a temperature reaches a substantial reaction temperature shown in Condition 1 from room temperature is preferably within 30%, more preferably within 20%, further preferably within 10% of total step time. In addition, a time until a pressure reaches a substantial reaction pressure shown in Condition 1 from a atmospheric pressure is preferably within 50%, more preferably within 40%, further preferably within 30% of total step time.

The melt polymerization step may be performed by a batch method or a continuous method, and a reaction vessel is not particularly limited, but, for example, a stirring tank-shaped reaction vessel, a mixer-type reaction vessel, a tower-type reaction vessel and an extruder-type reaction vessel can be used and these reaction tanks can be used by combining two or more kinds. In addition, the melt polymerization step is performed preferably by a continuous method, from a viewpoint of productivity.

In this step, any reaction apparatus can be used in the melt polymerization step, and it is preferable that an apparatus in which a reaction vessel and a refluxing device are connected is used, in that the aliphatic polyester resin having a high molecular weight and a high melting point, and excellent thermal stability and hue can be effectively obtained.

The reaction vessel may have one reaction chamber, or may be constructed of two or more reaction chambers which are divided with a partition plate, and is preferably constructed of two or more reaction chambers in that the polylactic acid-based resin having a high molecular weight can be effectively obtained.

It is preferable that the refluxing device is connected to an upper part of the reaction vessel, and it is more preferable that a vacuum pump is connected to the refluxing device. In addition, the refluxing apparatus separates volatile components, any refluxing apparatus may be used as far as it has a vaporization part having the function of removing a portion of volatile components to the outside of a reaction system, and a condensation part having the function of returning a portion of volatile components to a reaction system and, specifically, any refluxing apparatus can be used as far as it removes water among volatile components and returns lactic acid and lactide or a low molecular weight polymer thereof to the reaction vessel of the melt polymerization step. Herein, as a condenser constituting the condensation part, for example, a system such as a double tube, a multi-tube, a coil, a plate, a plate fin, a vortex, and a jacket can be exemplified.

In the melt polymerization step, a method of taking out the produced low-molecular product from the reaction vessel is not particularly limited, but examples include a method of taking out the product by extrusion with an inert gas such as nitrogen, and a method of taking out the product with a gear pump, and a method of taking out the product by extrusion with an inert gas such as nitrogen is preferable, from a viewpoint of handling of the low-molecular product having a low viscosity.

In the melt polymerization step, it is preferable to produce a prepolymer having a weight average molecular weight of more than 10,000 and less than 100,000, it is preferable to produce a prepolymer having a weight average molecular weight of 10,000 to 90,000, it is more preferable to produce a prepolymer having a weight average molecular weight of 12,000 to 80,000, it is further preferable to produce a prepolymer having a weight average molecular weight of 15,000 to 70,000, and is particularly preferable to produce a prepolymer having a weight average molecular weight of 17,000 to 50,000. Herein, the weight average molecular weight is a value of a weight average molecular weight calculated as standard poly(methyl methacrylate) as measured by gel permeation chromatography (GPC) using hexafluoroisopropanol as a solvent, or a value of a weight average molecular weight in terms of standard polystyrene as measured by GPC using chloroform as solvent.

Next, the solid phase polymerization step will be explained. The reaction condition of the solid phase polymerization step is not particularly limited, but the step can be performed under various conditions, may be performed at a one stage or at a multistage of 2 or more stages, and may be performed in a batch method or continuous method. It is preferable that the solid phase polymerization step is continuously performed under the condition including the following two stages:

Condition 1: 130° C. to 150° C.;
Condition 2: Higher than 150° C. to 165° C.

The solid phase polymerization step is performed preferably at a temperature of the melting point of the prepolymer or lower, and is performed at a temperature of preferably 90° C. to 170° C., more preferably 130° C. to 165° C., more preferably 135° C. to 160° C., further preferably 140° C. to 160° C., in that the aliphatic polyester resin having a high molecular weight and a high melting point, and excellent hue can be effectively obtained. In addition, a temperature of the solid phase polymerization step may be at a one stage, or at a multistage of 2 or more stages, and is preferably at a multistage of 2 or more stages in that the resin is easy to increase molecular weight in a short time, and is also excellent in hue, and it is more preferable that a temperature is raised stepwisely as a reaction proceeds. For example, a method of performing a reaction at a temperature of higher than 150° C. to 165° C. after a reaction at a temperature of 130° C. to 150° C. is exemplified.

It is preferable that the solid phase polymerization step is performed for a reaction time of 1 to 100 hours in that the polylactic acid-based resin having a high molecular weight and a high melting point, and excellent thermal stability and hue can be effectively obtained, and the solid phase polymerization step is performed for a reaction time of preferably 3 to 80 hours, more preferably 5 to 50 hours, further preferably 10 to 30 hours in that the aliphatic polyester resin also excellent in hue can be effectively obtained.

In addition, when a temperature of the solid phase polymerization step is at a multistage of 2 or more stages, for example, a method of performing a first stage at a temperature of 130° C. to 150° C. for 1 to 50 hours, and a second stage at a temperature of higher than 150° C. to 165° C. for 1 to 50 hours is exemplified, and it is more preferable to perform a first stage at a temperature of 120° C. to 140° C. for 5 to 20 hours, a second stage at a temperature of 140° C. to 150° C. for 5 to 20 hours, and a third stage at a temperature of 150° C. to 160° C. for 10 to 30 hours in that the resin is easy to increase molecular weight in a short time, and is excellent in hue. In addition, even when a temperature is at a multistage of 2 or more stages, a total of a reaction time of the solid phase polymerization step is 1 to 100 hours.

At the solid phase polymerization step, pressure condition is not particularly limited, but any of reduced pressure condition, atmospheric pressure condition and increased pressure condition may be used, and reduced pressure condition or atmospheric pressure condition is preferable in that the polylactic acid-based resin having a high molecular weight can be effectively obtained. When the solid phase polymerization step is performed under reduced pressure condition, it is preferable that the step is performed at a pressure of 0.13 to 1300 Pa. In addition, the step is performed at a pressure of preferably 1 to 1000 Pa, more preferably 10 to 900 Pa, further preferably 100 to 800 Pa, particularly preferably 500 to 700 Pa. In addition, a pressure of the solid phase polymerization step may be at a one stage, or at a multistage of 2 or more stages, preferably at a multistage of 2 or more stages and, for example, a method of performing a reaction at a pressure of 0.13 to 700 Pa after a reaction at a pressure of 700 to 1300 Pa is exemplified. When the step is performed under atmospheric pressure condition, it is preferable that the step is performed under a stream of an inert gas such as dry nitrogen.

When the solid phase polymerization step is performed, a shape of the prepolymer is not particularly limited, but any of a block, a film, a pellet and a powder may be performed, and it is preferable to use a pellet or a powder in that the solid phase polymerization can be effectively proceeded. Examples of a method of preparing the prepolymer into pellets include a method of extruding a molten prepolymer into a strand, and pelletizing the strand with a strand cutter, and a method of dropping the prepolymer as liquid droplets using a dropping nozzle, and contacting the liquid droplets with a gas or a liquid into pellets. In addition, examples of a method of preparing the prepolymer into the powder include a method of grinding the prepolymer using a mixer, a blender, a ball mill or a hammer grinding machine. In the case of the powder, an average particle diameter is preferably 0.01 to 3 mm, more preferably 0.1 to 1 mm in that the prepolymer can be effectively solid phase-polymerized.

The solid phasestate polymerization step may be by a batch method or a continuous method and, as a reaction vessel, a stirring tank-type reaction vessel, a mixer-type reaction vessel and a tower-type reaction vessel can be used, and these reaction vessels can be used by combining 2 or more kinds. In addition, it is preferable that the step is performed by a continuous method from a viewpoint of productivity.

The weight average molecular weight of the aliphatic polyester resin obtained by the method is not particularly limited, but 30,000 or more, particularly 100,000 or more is preferable from a viewpoint of mechanical property. It is preferably 10,000 to 1,200,000, more preferably 120,000 to 300,000, further preferably 140,000 to 250,000 in that particularly, moldability and mechanical property are excellent. Herein, the weight average the molecular weight is a value of a weight average molecular weight in terms of standard poly(methyl methacrylate) as measured by gel permeation chromatography (GPC) using hexafluoroisopropanol as a solvent, or a value of a weight average molecular weight in terms of standard polystyrene as measured by GPC using chloroform as a solvent. In addition, the ratio of a weight average molecular weight with respect to a number average molecular weight is preferably 1.4 to 3, more preferably 1.5 to 2.5 from a viewpoint of uniformity of polymer property.

In addition, it is preferable that a weight loss rate when retained at 200° C. for 20 minutes under a nitrogen stream is 2% or less, particularly 1% or less, further 0.6% or less in that thermal stability is excellent, and the weight loss rate is more preferably 0.4% or less, further preferably 0.1% or less. It is preferable that a thermal weight loss speed is 0.1 wt %/min or less, particularly 0.05 wt %/min or less, further 0.03 wt %/min or less, and the speed is more preferably 0.02 wt %/min or less, further preferably 0.005 wt %/min or less. The weight loss rate can be measured, for example, with a thermogravimetric analyzer (TGA), and a flow rate of nitrogen is preferably 20 to 200 ml/min, more preferably 60 to 120 ml/min.

The content of the sulfonic acid group-containing compound after solid phase polymerization is 300 to 3000 ppm with respect to a produced polymer calculated as sulfer atoms, and a residual rate of the sulfonic acid group-containing compound after the solid phase polymerization is more than 50%. The residual rate (R) referred herein is a measure of change in a concentration of the sulfonic acid group-containing compound which is a catalyst, before and after a polymerization reaction, and is shown by the following equations (1) to (3):

$$R[\%]=Ca[\text{ppm}]/Cb[\text{ppm}]\times 100 \quad (1)$$

(Cb: a theoretical concentration when all of an added catalyst remains in a polymer, calculated by an equation (2), Ca: an actual concentration of a catalyst remaining in a polymer after a polymerization reaction, calculated by an equation (3));

$$Cb[\text{ppm}]=Wb[\text{g}]/Wp[\text{g}]\times 10^6 \quad (2)$$

(Wb: a weight of a catalyst added to a polymerization step, Wp: a weight of a polymer after a polymerization reaction);

$$Ca[\text{ppm}]=Wa[\text{g}]/Wp[\text{g}]\times 10^6 \quad (3)$$

(Wa: a weight of a catalyst in a polymer after a polymerization reaction, Wp: a weight of a polymer after a polymerization reaction).

The content of the sulfonic acid group-containing compound after solid phase polymerization is preferably 350 to 2500 ppm, further preferably 400 to 2000 ppm, particularly preferably 500 to 1500 ppm with respect to a produced polymer calculated as sulfer atoms.

The residual rate can be also expressed by the following (4) equation:

$$R[\%]=(mp\times Csp)/(m0\times Cs0)\times 100 \quad (4)$$

(wherein m0 is a weight of a monomer added during a polymerization process, mp is a weight of a polymer obtained after polymerization, Cs0 is a concentration of sulfur with respect to a monomer, at polymerization, and Csp is a concentration of sulfur after polymerization).

The residual rate is preferably 60% or more, more preferably 70% or more, further preferably 80% or more, particularly preferably 90% or more.

When the tin compound, the titanium compound, the lead compound, the zinc compound, the cobalt compound, the iron compound, the lithium compound, and the rare earth compound are used, the ratio of a sulfur atom molar amount of the sulfonic acid group-containing compound with respect to a total metal molar amount after solid phase polymerization is preferably 3.0 to 50, more preferably 4.0 to 40 from a viewpoint of interaction between the metal compound and the sulfonic acid group-containing compound.

Upon implementation of the solid phase polymerization step, it is preferable that the prepolymer has been crystallized, and it is more preferable that crystallization treatment is performed after completion of the melt polymerization step and before initiation of the solid phase polymerization step.

A method of crystallization is not particularly limited, but the known method can be utilized. For example, a method of treatment at a crystallization temperature in a gas phase or a liquid phase, a method of dissolving the prepolymer in a solvent into a solution, and vaporizing the solvent, a method of contacting the prepolymer with a solvent, and a method of cooling to solidify the molten prepolymer while operation of stretching or shearing is conducted are exemplified and, from a viewpoint of simple operation, a method of treatment at a crystallization temperature in a gas phase or a liquid phase is preferable.

The crystallization temperature referred herein is not particularly limited, as far as it is in a temperature range of higher than a glass transition temperature of the prepolymer which can be obtained in the melt polymerization step, and lower than a melting point of the prepolymer, but is more preferably in a range between a crystallization temperature at heating and a crystallization temperature at cooling as measured with a differential scanning calorimeter (DSC) in advance. In the case where the aliphatic polyester resin is the polylactic acid-based resin, the crystallization temperature is preferably 50 to 150° C., further preferably 55 to 145° C., most preferably 60 to 140° C., in that the polylactic acid-based resin having a high molecular weight and a high melting point, and excellent hue can be effectively obtained.

In addition, a crystallization time is not particularly limited, but when the time is within 3 hours, the resin is sufficiently crystallized, and within 2 hours is also preferable. Further, pressure condition in crystallization treatment may be any condition under reduced pressure, atmospheric pressure and increased pressure.

A shape of the prepolymer upon crystallization treatment is not particularly limited, but any of a block, a film, a pellet and a powder may be used, and it is preferable to use a pellet or a powder in that the resin can be effectively crystallized. Example of a method of preparation into a pellet include a method of extruding the molten prepolymer into a strand, and pelletizing the strand with a strand cutter, a method of dropping the prepolymer as liquid droplets using a dropping nozzle, and contacting the liquid droplets with a gas or a liquid to pelletize them, and a method of extruding the prepolymer into a gas or a liquid through a spinneret and, simultaneously, cutting it. Further, examples of a method of preparation into a powder include a method of grinding the prepolymer using a mixer, blender, a ball mill or a hammer grinding machine. In the case of a powder, an average particle diameter is preferably 0.01 to 3 mm, more preferably 0.1 to 1 mm, in that the resin can be effectively crystallized.

It is preferable to add at least one kind selected from a nitrogen-containing organic compound, an alkali metal compound, and an alkaline earth metal compound at any stage from initiation of the melt polymerization step to after completion of the solid phase polymerization step, in that hydrolysis resistance is excellent. When a polymerization catalyst, particularly, a catalyst having an acid remains, hydrolysis of the aliphatic polyester resin by the residual catalyst at melt-kneading and melt formation is suppressed, thereby, hydrolysis resistance can be improved.

The nitrogen-containing organic compound is one or more kinds of compounds selected from an aliphatic amine compound, an aromatic amine compound, a nitrogen-containing heterocyclic compound and the like.

Specific examples of the nitrogen-containing organic compound include methylethylamine, triethylamine, dimethylpropylamine, ethylamine, isoamylamine, butylamine, propylamine, ethylenediamine, butanediamine, hexamethylenediamine, 1,2,3-triaminopropane, tetraethylammonium hydroxide, aniline, naphthylamine, naphthalenediamine, cyclohexane-diamine, benzenediamine, benzidine, diamino diphenyl ether, diaminodiphenylmethane, dibenzylamine, didodecylamine, pyrimidine, 2-aminopyrimidine, 2-amino-4-methyl-6-methoxypyrimidine, pyrimidine-2,4,6-triamine, N-(2-aminoethyl)-N-pyrimidin-2-ylamine, 6-tert-butylpyrimidine-4-amine, 4,6-dimethoxy-5-phenylpyrimidine-2-amine, 2-ethoxypyrimidine-4,6-diamine, 5-phenylpyrimidine-4-amine, 3,9-bis[2-(3,5-diaminio-2,4,6-triazaphenyl)ethyl]-2,4,8,10-tetraoxaspiro[5.5]undecane, ethylenediamine-tetraacetic acid, an alkali metal salt (Li, Na, K) salt of ethylenediamine-tetraacetic acid, N,N'-disalicylidene-ethylenediamine, N,N'-disalicylidene-1,2-propylenediamine, N,N"-disalicylidene-N'-methyl-dipropylenetriamine, 3-salicyloylamino-1,2,4-triazole, N,N,N'-trimethylethylenediamine, 1,3-dimethyl-3,4,5,6-tetrahydro-2(1H)-pyrimidinone, 2,3-dimethylpyrazine, 2,4,6-trimethylpyridine, 2,4,7-triamino-6-phenylpterine, 2,6-diaminopurine, 2,6-dimethylpyridine, 2-acetylpyrrole, 2-amino-4,6-dimethylpyrimidine, 2-amino-4-methoxy-6-methylpyrimidine, 2-amino-4-methylpyridine, 2-amino-4-methylpyrimidine, 2-amino-4-methylbenzonitrile, 3-amino-4-methylbenzamide, 3-nitropyridine, 3-methylindole, 3-methyldiphenylamine, 4,6-dimethylpyrimidine, 4-methylimidazole, 4-methylpyridine, 4-methylpyrimidine, 4-chlorinephenylenediamine, 4-iodinepyrimidine, 5-aminoacridine, 5-fluoroaniline, 6-benzylaminopurine, 9-aminoacridine, m-phenylenediamine, N-benzylpyrrole, N-methylimidazole, o-phenylenediamine, p-toluidine, p-phenylenediamine, acridine, isoquinoline, imidazole, indole, eicosyldiamine, ethanolamine, oxamide, quinoline, diisopropylamine, diethanolamine, dichloroaniline, dicyclohexylamine, didecylamine, diphenylamine, decamethylenediamine, tetrabutylammonium bromide, tetramethylenediamine, dodecylaniline, dodecyldiamine, triethanolamine, trishydroxymethylaminomethane, trihexylamine, trilaurylamine, pyrazine, pyridine, pyrrole, pterine, purine, hexylamine, benzylamine, methylamine, 1,2-di(2,2,6,6-tetramethyl-4-piperidinooxy)-ethane, 1-[2-{3-(3,5-di-t-butyl-4-hydroxyphenyl group)propionyloxy}-butyl]-4-[3-(3,5-di-t-butyl-4-hydroxyphenyl)propionyloxy]2,2,6,6-tetramethylpiperidine, 4-(ethylaminoformyloxy)-2,2,6,6-tetramethylpiper-idine, 4-(cyclohexylaminoformyloxy)-2,2,6,6-tetramethylpiperidine, 4-(phenylaminoformyloxy)-2,2,6,6-tetramethylpiperidine, 4-propyleneacyloxy-2,2,6,6-tetramethylpiperidine, aminopyrimidine, di(2,2,6,6-tetramethyl-4-piperidino)-adipic acid ester, di(2,2,6,6-tetramethyl-4-piperidino)-oxalic acid ester, di(2,2,6,6-tetramethyl-4-piperidino)-sebacic acid ester, di(2,2,6,6-tetramethyl-4-piperidino)-terephthalic acid ester, di(2,2,6,6-tetramethyl-4-piperidino)-hexamethylene-1,6-dicarbamic acid ester, di(2,2,6,6-tetramethyl-4-piperidino)-malonic acid ester, di(2,2,6,6-tetramethyl-4-piperidino)-carbonic acid ester, di(2,2,6,6-tetramethyl-4-piperidinophenylene-2,4-carbamic acid ester, diaminodecane, didecylamine, dihexylamine, dimethylpyrimidine, tributylamine, and hydroxylpyrimidine, also include hindered amine compounds such as 4-acetoxy-2,2,6,6-tetramethylpiperidine, 4-stearoyloxy-2,2,6,6-tetramethylpiperidine, 4-acryloyl-oxy-2,2,6,6-tetramethylpiperidine, 4-(phenylacetoxy)-2,2,6,6-tetramethylpiperidine, 4-benzoyl-oxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl)-carbonate, bis(2,2,6,6-tetramethyl-4-piperidyl)-oxalate, bis(2,2,6,6-tetramethyl-4-piperidyl)-malonate, bis(2,2,6,6-tetramethyl-4-piperidyl)-sebacate, bis (2,2,6,6-tetramethyl-4-piperidyl)-adipate, bis(2,2,6,6-tetramethyl-4-piperidyl)-terephthalate, 1,2-bis(2,2,6,6-tetramethyl-4-piperidyloxy)-ethane, α,α'-bis(2,2,6,6-tetramethyl-4-piperidyloxy)-p-xylene, bis(2,2,6,6-tetramethyl-4-piperidyltolylene-2,4-dicarbamate, bis(2,2,6,6-tetramethyl-4-piperidyl)-hexamethylene-1,6-dicarbamate, tris(2,2,6,6-tetramethyl-4-piperidyl)-benzene-1,3,5-tricarboxylate, tris(2,2,6,6-tetramethyl-4-piperidyl)-benzene-1,3,4-tricarboxylate, 1-[2-{3-(3,5-di-t-butyl-4-hydroxyphenyl) propionyloxy}butyl]-4-[3-(3,5-di-t-butyl-4-hydroxyphenyl) propionyloxy]2,2,6,6-tetramethylpiperidine, a condensate of 1,2,3,4-butanetetracarboxylic acid and 1,2,2,6,6-pentamethyl-4-piperidinol and β,β,β',β'-tetramethyl-3,9-[2,4,8,10-tetraoxaspiro(5,5)undecane]diethanol, and a polycondensate of succinic acid dimethyl-1-(2-hydroxyethyl)-4-hydroxy-2,2,6,6-tetramethylpiperidine, and also include polyvalent amines such as 3,9-bis[2-(3,5-diamino-2,4,6-triazaphenyl) ethyl]-2,4,8,10-tetraoxaspiro[5.5]undecane, ethylenediamine-tetraacetic acid, an alkali metal salt (Li, Na, K) salt of ethylenediamine-tetraacetic acid, N,N'-disalicylidene-ethylenediamine, N,N'-disalicylidene-1,2-propylenediamine, N,N"-disalicylidene-N'-methyl-dipropylenetriamine, and 3-salicyloyl-amino-1,2,4-triazol and, among them, it is preferable that at least one kind of an aromatic amine compound, an alkylamine compound having 4 or more carbon atoms, and a compound having a pyrimidine skeleton is contained.

Specific examples of the alkali metal compound include lithium compounds such as lithium isopropoxide, lithium chloride, lithium acetate, lithium lactate, lithium octylate, lithium stearate, lithium naphthenate, tert-butyllithium carbonate, lithium sulfate, and lithium oxide, sodium compounds such as sodium isopropoxide, sodium chloride, sodium acetate, sodium lactate, sodium octylate, sodium stearate, sodium naphthenate, tert-butylsodium carbonate, sodium sulfate, and sodium oxide, potassium compounds such as potassium isopropoxide, potassium chloride, potassium acetate, potassium lactate, potassium octylate, potassium stearate, potassium naphthenate, tert-butylpotassium carbonate, potassium sulfate, and potassium oxide and, among them, it is preferable that at least one kind of an organic carboxylic acid alkali metal compound having 4 or more carbon atoms is contained.

Specific examples of the alkaline earth metal compound include magnesium compounds such as magnesium diisopropoxide, magnesium chloride, magnesium acetate, magnesium lactate, magnesium stearate, magnesium carbonate, magnesium sulfate, and magnesium oxide, calcium compounds such as diisopropoxycalcium, calcium chloride, calcium acetate, calcium octylate, calcium naphthenate, calcium lactate, calcium stearate, and calcium sulfate, barium compounds such as diisopropoxybarium, barium chloride, barium acetate, barium octylate, barium naphthenate, barium lactate, barium stearate, and barium sulfate and, among them, it is preferable that at least one kind of an organic carboxylic acid alkaline earth metal compound having 4 or more carbon atoms is contained.

The addition amount of the nitrogen-containing organic compound, the alkali metal, or the alkaline earth compound is not particularly limited, but is preferably 0.001 to 2 parts by weight, more preferably 0.01 to 1 part by weight, further preferably 0.05 to 0.5 part by weight, most preferably 0.08 to 0.3 part by weight, with respect to 100 parts by weight of the aliphatic polyester resin, in that hydrolysis resistance is excellent. In addition, when the nitrogen-containing organic compound is used, the ratio of a nitrogen atom molar amount of the nitrogen-containing organic compound with respect to a sulfur atom molar amount of the sulfonic acid group-containing compound in a polymer after solid phase polymerization is preferably 0.2 to 5, further preferably 0.25 to 4, particularly preferably 0.3 to 3.3, more preferably 0.4 to 2.5. In addition, when the nitrogen-containing organic compound is aliphatic amine, it is preferable that the ratio is 0.3 to 0.9.

The timing of addition of the nitrogen-containing organic compound, the alkali metal, or the alkaline earth metal is not particularly limited, but may be any of before initiation and after completion of each of the melt polymerization step and the solid phase polymerization step, and addition at a stage of the melt polymerization step is preferable in that the polylactic acid-based resin having a high melting point and a high molecular weight can be obtained, addition at immediately before completion of Condition 1 or at initiation of Condition 2 of the melt polymerization step is more preferable in that productivity is excellent, and addition of each of immediately before completion of Condition 1 and at initiation of Condition 2 of the melt polymerization step is further preferable. The addition after addition of the sulfonic acid group-containing compound is preferable in that productivity is excellent similarly. In the case of the addition at initiation of Condition 2 of the melt polymerization step, it is preferable to add a catalyst for solid phase polymerization after addition of the nitrogen-containing organic compound, the alkali metal or the alkaline earth metal.

In the case of the addition at each stage of Condition 1 or Condition 2 of the melt polymerization step, the addition of each 0.001 to 1 part by weight with respect to 100 parts by weight of the aliphatic polyester resin is preferable, and the addition of each 0.01 to 0.5 part by weight is more preferable, and the addition of each 0.01 to 0.1 part by weight is further preferable in that productivity is excellent. In addition, the addition after completion of the solid phase polymerization step is also preferable in that the aliphatic polyester resin excellent in hydrolysis resistance can be obtained.

A method of adding the nitrogen-containing organic compound, the alkali metal, or the alkaline earth metal is not particularly limited, but examples of the method include a method of melt-kneading at a melting point of the aliphatic polyester resin or higher, a method of dissolving a material in a solvent, mixing the solution, and removing the solvent, and the like, and a method of melt-kneading at a melting point of the aliphatic polyester resin or higher is preferable, in that the resin can be effectively produced. The method of melt-kneading may be by a batch method or a continuous method and, as an apparatus, a single screw extruder, a twin screw extruder, a multiaxial extruder, a plast mill, a kneader and a stirring type reactor equipped with a pressure reducing device can be used, and it is preferable to use a monoaxial extruder or a biaxial extruder in that a material can be effectively and uniformly kneaded.

As another addition method, there is a method of absorbing the nitrogen-containing organic compound, the alkali metal, or the alkaline earth metal at a melting point of the aliphatic polyester resin or lower, and examples of the method include a method of absorbing the nitrogen-organic compound, the alkali metal or the alkaline earth metal in a gas phase at a temperature of a glass transition temperature of the aliphatic polyester or higher, and a method of absorbing the nitrogen-containing organic compound, the alkali metal, or the alkaline earth metal dissolved in a solvent, in a liquid phase.

A temperature at the addition of the nitrogen-containing organic compound, the alkali metal, or the alkaline earth metal is preferably 170° C. to 250° C., further preferably 180 to 240° C. and, in that mechanical property is excellent, a temperature of 190 to 230° C. is more preferable.

A pressure at the addition of the nitrogen-containing organic compound, the alkali metal or the alkaline earth metal may be any of a reduced pressure, a atmospheric pressure and a increased pressure, and a reduced pressure is preferable in that a produced gas can be removed at melt-kneading.

Atmospheric condition at melt-kneading may be any of under atmospheric air atmosphere and under atmosphere of an inert gas such as nitrogen, and it is preferable to perform melt-kneading under inert gas atmosphere in that an amount of the gas generated at melt-kneading can be reduced.

When mixing is performed in a solvent, a solvent in which a polymer and a monomer dissolve is used. As the solvent, for example, chloroform, methylene chloride and acetonitrile can be used. When it is necessary to remove a solvent after mixing, a method of removing the solvent is not particularly limited but, for example, a method of vaporizing a solvent at room temperature and a method of vaporizing a solvent at a temperature of a boiling point of the solvent or higher under reduced pressure can be used.

In addition, ammonia can be also used in place of the nitrogen-containing organic compound.

It is preferable to add a stabilizer at any stage from initiation of the melt polymerization step to completion of the solid phase polymerization step.

Examples of the stabilizer referred include hindered phenol-based compounds, thioether-based compounds, vitamin-based compounds, triazole-based compounds, hydrazine-derivative based compounds and phosphorus-based compounds, and these may be used together. Among them, it is preferable that at least one kind of the phosphorus-based compound is contained, and a phosphate-based compound, or a phosphite-based compound is further preferable. A further preferable example of embodiments is "Adeka Stab" AX-71 manufactured (dioctadecyl phosphate), PEP-8 (distearylpentaerythritol diphosphite), PEP-36 (cyclic neopentatetraylbis (2,6-t-butyl-4-methylphenyl)phosphite) by ADEKA.

Examples of the hindered phenol-based compound include n-octadecyl-3-(3',5'-di-t-butyl-4'-hydroxyphenyl)-propionate, n-octadecyl-3-(3'-methyl-5'-t-butyl-4'-hydroxyphenyl)-propionate, n-tetradecyl-3-(3',5'-di-t-butyl-4'-hydroxyphenyl)-propionate, 1,6-hexanediol-bis-[3-(3,5-di-t-butyl-4-hydroxyphenyl)-propionate], 1,4-butanediol-bis-[3-(3,5-di-t-butyl-4-hydroxyphenyl)-propionate], 2,2'-methylenebis-(4-methyl-t-butylphenol), triethylene glycol-bis-[3-(3-t-butyl-5-methyl-4-hydroxyphenyl)-propionate], tetrakis [methylene-3-(3',5'-di-t-butyl-4'-hydroxyphenyl) propionate]methane, 3,9-bis[2-{3-(3-t-butyl-4-hydroxy-5-methylphenyl)propionyloxy}-1,1-dimethylethyl]2,4,8,10-tetraoxaspiro(5,5)undecane, N,N'-bis-3-(3',5'-di-butyl-4'-hydroxy-phenyl)propionylhexamethylenediamine, N,N'-tetramethylene-bis-3-(3'-methuyl-5'-t-butyl-4'-hydroxyphenol)propionyldiamine, N,N'-bis-[3-(3,5-di-t-butyl-4-hydroxyphenol)propionyl]hydrazine, N-salicyloyl-N'-salicylidenehydrazine, 3-(N-salicyloyl)amino-1,2,4-triazole, N,N'-bis[2-{3-(3,5-di-t-butyl-4-hydroxyphenyl) propionyloxy}ethyl]oxyamide, pentaerythrityl-tetrakis[3-(3,5-d-t-butyl-4-hydroxyphenyl)propionate], N,N'-hexamethylenebis-(3,5-di-t-butyl-4-hydroxy-hydrocinnamide and the like. Preferable are triethylene glycol-bis-[3-(3-t-butyl-5-methyl-4-hydroxyphenyl)-propionate], tetrakis [methylene-3-(3',5'-di-t-butyl-4'-hydroxyphenyl)propionate]methane, 1,6-hexanediol-bis-[3-(3,5-di-t-butyl-4-hydroxyphenyl)-propionate], pentaerythrityl-tetrakis[3-(3,5-di-t-butyl-4-hydroxyphenyl)propionate], and N,N'-hexamethylenebis-(3,5-di-t-butyl-4-hydroxy-hydrocinnamide. Examples of a specific trade name of the hindered phenol-based compound include "Adeka Stab" AO-20, AO-30, AO-40, AO-50, AO-60, AO-70, AO-80, and AO-330 manufactured by ADEKA, "Irganox" 245, 259, 565, 1010, 1035, 1076, 1098, 1222, 1330, 1425, 1520, 3114, and 5057 manufactured by Ciba Specialty Chemicals, "Sumilizer" BHT-R, MDP-S, BBM-S, WX-R, NR, BP-76, BP-101, GA-80, GM, and GS manufactured by Sumitomo Chemical Co. Ltd, "Cyanox" CY-1790 manufactured by Cyanamide, and the like.

Examples of the thioether-based compound include dilauryl thiodipropionate, ditridecyl thiodipropionate, dimyristyl thiodipropionate, distearyl thiodipropionate, pentaerythritol-tetrakis(3-lauryl thiopropionate), pentaerythritol-tetrakis(3-dodecyl thiopropionate), pentaerythritol-tetrakis(3-octadecyl thiopropionate), and pentaerythritol-tetrakis(3-myristyl thio-propionate), pentaerythritol-tetrakis(3-stearyl thiopropionate). Examples of a specific trade name of the thioether-based compound include "Adeka Stab" AO-23, AO-412S, and AO-503A manufactured by ADEKA, "Irganox" PS802 manufactured by Ciba Specialty Chemicals, "Sum-ilizer" TPL-R, TPM, TPS, and TP-D manufactured by Sumitomo Chemical Co, Ltd., DSTP, DLTP, DLTOIP, and DMTP manufactured by API Corporation, "SEENOX" 412S manufactured by Shipro Kasei Kaisha, Ltd., "Cyanox" 1212 manufactured by Cyanamide and the like.

Examples of the vitamin-based compound include natural products such as d-α-tocopherol acetate, d-α-tocopherol succinate, d-α-tocopherol, d-β-tocopherol, d-γ-tocopherol, d-δ-tocopherol, d-α-tocotrienol, d-β-tocophetrienol, d-γ-tocophetrienol, and d-δ-tocophetrienol, and synthetic products such as dl-α-tocopherol, dl-α-tocopherol acetate, dl-α-tocopherol succinate calcium and dl-α-tocopherol nicotinate. Examples of a specific trade name of the vitamin-based compound include "Tocopherol" manufactured by Eisai. Co., Ltd., "Irganox" E201 manufactured by Ciba Specialty Chemicals, and the like.

Examples of the triazole-based compound include benzotriazole, 3-(N-salicyloyl)amino-1,2,4-triazole and the like.

Examples of the hydrazine derivative-based compound include decamethylenedicarboxylic acid-bis(N'-salicyloylhydrazide), isophthalic acid bis(2-phenoxypropionylhydrazide), N-formyl-N'-salicyloylhydrazine, 2,2-oxamidobis-[ethyl-3-(3,5-di-t-butyl-4-hydroxyphenyl)propionate], oxalyl-bis-benzylidene-hydrazide, nickel-bis(1-phenyl-3-methyl-4-decanoyl-5-pyazolate), 2-ethoxy-2'-ethyloxanilide, 5-t-buthyl-2-ethoxy-2'-ethyloxanilide, N,N-diethyl-N', N'-diphenyloxamide, N,N'-diethyl-N,N'-diphenyloxamide, oxalic acid-bis(benzylidene-hydrazide), thiodipropionic acid-bis(benzylidenehydrazide), bis(salicyloylhydrazine), N-salicylidene-N'-salicyloylhydrazone, N,N'-bis[3-(3,5-di-t-butyl-4-hydroxyphenyl)propionyl]hydrazine, N,N'-bis[2-[3-(3,5-di-t-butyl-4-hydroxyphenyl)propionyloxy]ethyl]oxamide and the like.

Examples of the phosphorus-based compound include phosphite-based compounds and phosphate-based compounds. Examples of such a phosphite-based compound include tetrakis[2-t-butyl-4-thio(2'-methyl-4'-hydroxy-5'-t-butylphenyl)-5-methylphenyl]-1,6-hexamethylene-bis(N-hydroxyethyl-N-methylsemicarbazide)-diphosphite, tetrakis [2-t-butyl-4-thio(2'-methyl-4'-hydroxy-5'-t-butylphenyl)-5-methylphenyl]-1,10-decamethylene-di-carboxylic acid-di-hydroxyethylcarbonylhydrazide-diphosphite, tetrakis [2-t-butyl-4-thio(2'-methyl-4'-hydroxy-5'-t-butylphenyl)-5-methylphenyl]-1,10-decamethylene-di-carboxylic acid-di-salicyloylhydrazide-diphosphite, tetrakis[2-t-butyl-4-thio (2'-methyl-4'-hydroxy-5'-t-butylphenyl)-5-methylphenyl]-di (hydroxyethylcarbonyl)hydrazide-diphosphite, tetrakis[2-t-butyl-4-thio(2'-methyl-4'-hydroxy-5'-t-butylphenyl)-5-methylphenyl]-N,N'-bis(hydroxyethyl)oxamide-diphosphite and the like, a compound in which at least one P—O bond is bound to an aromatic group is more preferable, examples include tris(2,4-di-t-butylphenyl)phosphite, tetrakis(2,4-di-t-butylphenyl)-4,4'-biphenylenephosphonite, bis(2,4-di-t-butylphenyl)pentaerythritol-di-phosphite, bis(2,6-di-t-butyl-4-methylphenyl)pentaerythritol-di-phosphite, 2,2-methylenebis(4,6-di-t-butyl-phenyl)octyl phosphite, 4,4'-butylidene-bis(3-methyl-6-t-butylphenyl-di-tridecyl) phosphite, 1,1,3-tris(2-methyl-4-ditridecylphosphite-5-t-buthyl-phenyl)butane, tris(mixed mono and di-nonylphenyl) phosphite, tris(nonylphenyl)phosphite, 4,4'-isopropylidenebis(phenyl-dialkyl phosphite) and the like, and tris(2,4-di-t-butylphenyl)phosphite, 2,2-methylenebis(4,6-di-t-butylphenyl)octyl phosphite, bis(2,6-di-t-butyl-4-methylphenyl)pentaerythritol-di-phosphite, tetrakis(2,4-di-t-butylphenyl)-4,4'-biphenylene phosphonite and the like can be preferably used. Examples of a specific trade name of the phosphite-based compound include "Adeka Stab" C, PEP-4C, PEP-8, PEP-11C, PEP-24G, PEP-36, HP-10, 2112, 260, 522A, 329A, 1178, 1500, C, 135A, 3010, and TPP manufactured by ADEKE. "Irgafos" 168 manufactured by Ciba Specialty Chemicals, "Sumilizer" P-16 manufactured by Sumitomo Chemical Co. Ltd., "Sandostab" P-EPQ manufactured by Clariant, "Weston" 618, 619G, and 624 manufactured by GE, and the like.

Specific examples of the phosphate-based compound include monostearyl acid phosphate, distearyl acid phosphate, methyl acid phosphate, isopropyl acid phosphate, butyl acid phosphate, octyl acid phosphate, isodecyl acid phosphate and the like, and among them, monostearyl acid phosphate, and distearyl acid phosphate are preferable. Examples of a specific trade name of the phosphate-based compound include "Irganox" MD1024 manufactured by Ciba Specialty Chemicals, "Inhibitor" OABH manufactured by Eastman Kodak, "Adeka Stab" CDA-1, CDA-6, and AX-71 manufactured by ADEKA, and the like.

The addition amount of the stabilizer is not particularly limited, but it is preferably 0.001 to 2 parts by weight, more preferably 0.01 to 1 part by weight, further preferably 0.05 to 0.5 part by weight, most preferably 0.08 to 0.3 part by weight with respect to 100 parts by weight of the aliphatic polyester resin, in that thermal stability is excellent. The timing of the addition of the stabilizer is not particularly limited, but may be any of before initiation and after completion of each of the melt polymerization step and the solid phase polymerization step, and it is preferable that the stabilizer is added at a stage of the melt polymerization step in that the polylactic acid-based resin having a high melting point and a high molecular weight can be obtained and, in that productivity is excellent, it is more preferable that the stabilizer is added immediately before completion of Condition 1, or at initiation of Condition 2 of the melt polymerization step, and it is further preferable that the stabilizer is added at immediately before completion of Condition 1 and at initiation of Condition 2 of the melt polymerization step. In addition, when the stabilizer is added at initiation of Condition 2 of the melt polymerization step, it is preferable that a catalyst for solid phase polymerization is added after addition of the stabilizer. When the stabilizer is added at each stage of Condition 1, or Condition 2 of the melt polymerization step, it is preferable that each 0.001 to 1 part by weight is added with respect to 100 parts by weight of the aliphatic polyester resin and, in that productivity is excellent, it is more preferable that each 0.01 to 0.5 part by weight is added, and it is further preferable that each 0.01 to 0.1 part by weight is added. In addition, it is also preferable that the stabilizer is added after completion of the solid phase polymerization step, in that the aliphatic polyester resin excellent in thermal stability can be obtained.

A method of adding the stabilizer is not particularly limited, but examples of the method include a method of melt-kneading at a melting point of the aliphatic polyester resin or higher, and a method of dissolving the stabilizer in a solvent, mixing the solution, and removing the solvent and, in that the resin can be effectively produced, a method of melt-kneading at a melting point of the polylactic acid-based resin or higher is preferable. In addition, the method of melt-kneading may be by a batch method or a continuous method and, as an apparatus, a single screw extruder, a twin screw extruder, a multiscrew extruder, a plast mill, a kneader and a stirring-type reactor equipped with a pressure reducing device can be used and, in that the stabilizer can be effectively and uniformly kneaded, it is preferable to use a single screw extruder or a twin screw extruder.

A temperature for the addition of the stabilizer is preferably a temperature of 170° C. to 250° C., further preferably a temperature of 180 to 240° C. and, in that mechanical physical property is excellent, a temperature of 190 to 230° C. is more preferable. A pressure for addition of the stabilizer may be any of a reduced pressure, a atmospheric pressure and increased pressure and, in that a generated gas can be removed at melt-kneading, a reduced pressure is preferable.

Atmospheric condition at melt-kneading may be any of under air and under an inert gas such as nitrogen and, in that an amount of a gas generated at melt-kneading can be reduced, it is preferable that melt-kneading is performed under inert gas atmosphere. When the stabilizer is mixed in a solvent, a solvent in which a polymer and a monomer are dissolved is used. As the solvent, for example, chloroform, methylene chloride and acetonitrile can be used. A method of removing a solvent when it is necessary to remove the solvent after mixing is not particularly limited, but, for example, a method of vaporizing the solvent at room temperature and a method of vaporizing the solvent at a temperature of a boiling point of the solvent or higher under reduced pressure can be used.

Then, the aliphatic polyester resin composition will be described. The aliphatic polyester resin composition is characterized in that the aliphatic polyester resin contains a sulfonic acid group-containing compound having 2 or more sulfonic acid groups in one molecule, at 300 to 3000 ppm with respect to a produced polymer calculated as sulfer atoms. As the aliphatic polyester resin, the aforementioned resins can be used, and a polylactic acid-based resin is preferable.

As the sulfonic acid group-containing compound having 2 or more sulfonic acid groups in one molecule, the aforementioned compounds can be used and, specific examples include aliphatic or aromatic sulfonic acids such as 1,5-naphthalenedisulfonic acid, 1,6-naphthalenedisulfonic acid, 2,6-naphthalenedisulfonic acid, 2,7-naphthalenedisulfonic acid, 1,3,6-naphthalenetrisulfonic acid, 4,4-biphenyldisulfonic acid, o-benzenedisulfonic acid, m-benzenedisulfonic acid, p-benzenedisulfonic acid, 2,5-diamino-1,3-benzenedisulfonic acid, aniline-2,4-disulfonic acid, anthraquinone-1,5-disulfonic acid, polystyrenesulfonic acid, 1,2-ethanedisulfonic acid, 1,3-propanedisulfonic acid, methanedisulfonic acid, 1,4-butanedisulfonic acid, pentanedisulfonic acid, hexanedisulfonic acid, heptanedisulfonic acid, octanedisulfonic acid, nonanedisulfonic acid, decanedisulfonic acid, 1,11-undecanedisulfonic acid, 1,12-dodecanedisulfonic acid, phenol-2,4-disulfonic acid, catechol-3,5-disulfonic acid, benzidinedisulfonic acid, 2-naphthol-3,6-disulfonic acid, 2-haphthol-6,8-disulfonic acid, and 1,3,5-benzenetrisulfonic acid. Particularly, one or more kinds selected from methanedisulfonic acid, ethanedisulfonic acid, propanedisulfonic acid, butanedisulfonic acid, benzenedisulfonic acid, naphthalenedisulfonic acid, biphenyldisulfonic acid, phenoldisulfonic acid, catecholdisulfonic acid, benzidinedisulfonic acid, naphtholdisulfonic acid and benzenetrisulfonic acid are preferable.

The sulfonic acid group-containing compound having 2 or more sulfonic acid groups in one molecule is contained at 300 to 3000 ppm, preferably 350 to 2500 ppm, further preferably 400 to 2000 ppm, particularly preferably 500 to 1500 ppm with respect to a produced polymer calculated as sulfer atoms.

The aliphatic polyester resin composition may further contain one or more kinds of compounds selected from a nitrogen-containing organic compound, an alkali metal compound, and an alkaline earth metal compound.

The nitrogen-containing organic compound is one or more kinds of compounds selected from an aliphatic amine compound, an aromatic amine compound, and a nitrogen-containing heterocyclic compound.

Specific examples of the nitrogen-containing organic compound include methylethylamine, triethylamine, dimethylpropylamine, ethylamine, isoamylamine, butylamine, propylamine, ethylenediamine, butanediamine, hexamethylenediamine, 1,2,3-triaminopropane, tetraethylammonium hydroxide, aniline, naphthylamine, naphthalenediamine, cyclohexanediamine, benzenediamine, benzidine, diaminodiphenyl ether, diaminodiphenylmethane, dibenzylamine, didodecylamine, pyrimidine, 2-aminopyrimidine, 2-amino-4-methyl-6-methoxypyrimidine, pyrimidine-2,4,6-triamine, N-(2-aminoethyl)-N-pyrimidin-2-ylamine, 6-tert-butylpyrimidine-4-amine, 4,6-dimethoxy-5-phenylpyrimidine-2-amine, 2-ethoxypyrimidine-4,6-diamine, 5-phenylpyrimidine-4-amine 3,9-bis[2-(3,5-diamino-2,4,6-triazaphenyl)ethyl]-2,4,8,10-tetraoxaspiro [5.5]undecane, ethylenediamine-tetraacetic acid, an alkali metal salt (Li, Na, K) salt of ethylenediamine-tetraacetic acid, N,N'-disalicylidene-ethylenediamine, N,N'-disalicylidene-1,2-propylenediamine, N,N''-disalicylidene-N'-methyl-dipropylenetriamine, 3-salilcyloylamino-1,2,4-triazole, N,N,N'-trimethylethylenediamine, 1,3-dimethyl-3,4,5,6-tetrahydro-2(1H)pyrimidinone, 2,3-dimethylpyrazine, 2,4,6-trimethylpyridine, 2,4,7-triamino-6-phenylpterine, 2,6-diaminopurine, 2,6-dimethylpyridine, 2-acetylpyrrole, 2-amino-4,6-dimethylpyrimidine, 2-amino-4-methoxy-6-methylpyrimidine, 2-amino-4-methylpyridine, 2-amino-4-methylpyrimidine, 2-amino-4-methylbenzonitrile, 3-amino-4-methylbenzamide, 3-nitropyridine, 3-methylindole, 3-methyldiphenylamine, 4,6-dimethylpyrimidine, 4-methylimidazole, 4-methylpyridine, 4-methylpyrimidine, 4-chlorinephenylenediamine, 4-iodinepyrimidine, 5-aminoacridine, 5-fluoroaniline, 6-benzylaminopurine, 9-aminoacridine, m-phenylenediamine, N-benzylpyrrole, N-methylimidazole, o-phenylenediamine, p-toluidine, p-phenylenediamine, acridine, isoquinoline, imidazole, indole, eicosyldiamine, ethanolamine, oxamide, quinoline, diisopropylamine, diethanolamine, dichloroaniline, dicyclohexylamine, didecylamine, diphenylamine, decamethylenediamine, tetrabutylammonium bromide, tetramethylenediamine, dodecylaniline, dodecyldiamine, triethanolamine, trishydroxymethylaminomethane, trihexylamine, trilaurylamine, pyrazine, pyridine, pyrrole, pterine, purine, hexylamine, benzylamine, methylamine, 1,2-di(2,2,6,6-tetramethyl-4-piperidinooxy)-ethane, 1-[2-{3-(3,5-di-t-butyl-4-hydroxyphenyl group)propionyloxy}butyl]-4-[3-(3,5-di-t-butyl-4-hydroxyphenyl)propionyloxy]2,2,6,6-tetramethylpiperidine, 4-(ethylaminoformyloxy)-2,2,6,6-tetra-methylpiperidine, 4-(cyclohexylaminoformyloxy)-2,2,6,6-tetramethylpiperidine, 4-(phenylaminoformyloxy)-2,2,6,6-tetramethylpiperidine, 4-propyleneacyloxy-2,2,6,6-tetramethylpiperidine, aminopyrimidine, di(2,2,6,6-tetramethyl-4-piperidino)-adipic acid ester, di(2,2,6,6-tetramethyl-4-piperidino)-oxalic acid ester, di(2,2,6,6-tetramethyl-4-piperidino)-sebacic acid ester, di(2,2,6,6-tetramethyl-4-piperidino)-terephthalic acid ester, di(2,2,6,6-tetramethyl-4-piperidino)-hexamethylene-1,6-dicarbamic acid ester, di(2,2,6,6-tetramethyl-4-piperidino)-malonic acid ester, di(2,2,6,6-tetramethyl-4-piperidino)-carbonic acid ester, di(2,2,6,6-tetramethyl-4-piperidino-phenylene-2,4-carbamic acid ester, diaminodecane, didecylamine, dihexylamine, dimeth-ylpyrimidine, tributylamine, and hydroxylpyrimidine, also include hindered amine compounds such as 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl)-carbonate, bis(2,2,6,6-tetramethyl-4-piperidyl)-oxalate, bis(2,2,6,6-tetramethyl-4-piperidyl)-malonate, bis(2,2,6,6-tetramethyl-4-piperidyl)-sebacate, bis(2,2,6,6-tetramethyl-4-piperidyl)-adipate, bis(2,2,6,6-tetramethyl-4-piperidyl)-terephthalate, 1,2-bis(2,2,6,6-tetramethyl-4-piperidyloxy)-ethane, α,α'-bis(2,2,6,6-tetramethyl-4-piperidyloxy)-p-xylene, bis(2,2,6,6-tetramethyl-4-piperidyltolylene-2,4-dicarbamate, bis(2,2,6,6-tetramethyl-4-piperidyl)-hexamethylene-1,6-dicarbamate, tris(2,2,6,6-tetramethyl-4-piperidyl)-benzene-1,3,5-tricarboxylate, tris(2,2,6,6-tetramethyl-4-piperidyl)-benzene-1,3,4-tricarboxylate, 1-[2-{3-(3,5-di-t-butyl-4-hydroxyphenyl) propionyloxy}butyl]-4-[3-(3,5-di-t-butyl-4-hydroxyphenyl) propionyloxy]2,2,6,6-tetramethylpiperidine, a condensate of 1,2,3,4-butanetetracarboxylic acid and 1,2,2,6,6-pentamethyl-4-piperidinol and β,β,β',β'-tetramethyl-3,9-[2,4,8,10-tetraoxaspiro(5,5)undecane]diethanol, and a polycondensate of succinic acid dimethyl-1-(2-hydroxyethyl)-4-hydroxy-2,2,6,6-tetramethylpiperidine, and also include polyvalent amines such as 3,9-bis[2-(3,5-diamino-2,4,6-triazaphenyl) ethyl]-2,4,8,10-tetraoxaspiro[5.5]undecane, ethylenediamine-tetraacetic acid, an alkali metal salt (Li, Na, K) salt of ethylenediamine-tetraacetic acid, N,N'-disalicylidene-ethylenediamine, N,N'-disalicylidene-1,2-propylenediamine, N,N''-disalicylidene-N'-methyl-dipropylenetriamine, and 3-salicyloyl-amino-1,2,4-triazole and, among them, it is preferable that at least one kind of an aromatic amine compound, an alkylamine compound having 4 or more carbon atoms, and an amine compound having a pyrimidine skeleton is contained.

Specific examples of the alkali metal compound include lithium compounds such as lithium isopropoxide, lithium chloride, lithium acetate, lithium lactate, lithium octylate, lithium stearate, lithium naphthenate, tert-butyllithium carbonate, lithium sulfate, and lithium oxide, sodium compounds such as sodium isopropoxide, sodium chloride, sodium acetate, sodium lactate, sodium octylate, sodium stearate, sodium naphthenate, tert-butylsodium carbonate, sodium sulfate, and sodium oxide, potassium compounds such as potassium isopropoxide, potassium chloride, potassium acetate, potassium lactate, potassium octylate, potassium stearate, potassium naphthenate, tert-butylpotassium carbonate, potassium sulfate, and potassium oxide and, among them, it is preferable that at least one kind of an organic carboxylic acid alkali metal compound having 4 or more carbon atoms is contained.

Specific examples of the alkaline earth metal compound include magnesium compounds such as magnesium diisopropoxide, magnesium chloride, magnesium acetate, magnesium lactate, magnesium stearate, magnesium carbonate, magnesium sulfate, and magnesium oxide, calcium compounds such as diisopropoxycalcium, calcium chloride, calcium acetate, calcium octylate, calcium naphthenate, calcium lactate, calcium stearate, and calcium sulfate, and barium compounds such as diisopropoxybarium, barium chloride, barium acetate, barium octylate, barium naphthenate, barium lactate, barium stearate, and barium sulfate and, among them, it is preferable that at least one kind of an organic carboxylic acid alkaline earth metal compound having 4 or more carbon atoms is contained.

The addition amount of the nitrogen-containing organic compound, the alkali metal, or the alkaline earth metal is not particularly limited, but is preferably 0.001 to 2 parts by weight, more preferably 0.01 to 1 part by weight, further preferably 0.05 to 0.5 part by weight, most preferably 0.08 to 0.3 part by weight with respect to 100 parts by weight of the aliphatic polyester resin in that hydrolysis resistance is excellent. In addition, when the nitrogen-containing organic compound is used, the ratio of a nitrogen atom molar amount of the nitrogen-containing organic compound with respect to a sulfur atom molar amount of the sulfonic acid group-containing compound having 2 or more sulfonic acid groups in one molecule, in a polymer after solid phase polymerization is preferably 0.2 to 5, further preferably 0.25 to 4, particularly preferably 0.3 to 3.3, further preferably 0.4 to 2.5. In addition, when the nitrogen-containing organic compound is aliphatic amine, the ratio is preferably 0.3 to 0.9.

A weight average molecular weight of the aliphatic polyester resin in the aliphatic polyester resin composition is not particularly limited, but is preferably 30,000 or more, particularly 100,000 or more, preferably 100,000 to 1,200,000, more preferably 120,000 to 300,000, further preferably 140,000 to 250,000. The weight average molecular weight is a value of a weight average molecular weight calculated as standard polymethyl methacrylate as measured by gel permeation chromatography (GPC) using hexafluoroisopropanol as a solvent, or a value of a weight average molecular weight calculated as standard polystyrene as measured by GPC using chloroform as a solvent.

In addition, the ratio of a weight average molecular weight with respect to a number average molecular weight is preferably 1.4 to 3 from a viewpoint of uniformity of polymer physical property, and the ratio is more preferably 1.5 to 2.5.

In addition, it is preferable that a weight loss rate when retained at 200° C. for 20 minutes under a nitrogen stream is 2% or less, particularly 1% or less, further 0.6% or less in that thermal stability is excellent, and the rate is more preferably 0.4% or less, further preferably 0.1% or less. It is preferable that a thermal weight loss speed is 0.1 wt %/min or less, particularly 0.05 wt %/min or less, further 0.03 wt %/min or less, and the speed is more preferably 0.02 wt %/min or less, further preferably 0.005 wt %/min or less. The weight loss rate can be measured with, for example, a thermogravimetric analyzer (TGA), and a flow rate of nitrogen is preferably 20 to 200 ml/min, more preferably 60 to 120 ml/min.

In the aliphatic polyester resin composition, it is preferable that a weight average molecular weight is 100,000 or more, the ratio of a weight average molecular weight with respect to a number average molecular weight is 1.4 to 3, and a weight loss rate when retained at 200° C. for 20 minutes under a nitrogen stream is 0.6% or less.

To the aliphatic polyester resin composition can be added one kind or two or more kinds of a conventional additive, for example, a filler (glass fiber, carbon fiber, metal fiber, natural fiber, organic fiber, glass flake, glass beads, ceramic fiber, ceramic beads, asbestos, wollastonite, talc, clay, mica, sericite, zeolite, bentonite, montmorillonite, synthetic mica, dolomite, kaolinite, silicic acid fine powder, feldspar powder, potassium titanate, shirasu balloon, calcium carbonate, magnesium carbonate, barium sulfate, calcium oxide, aluminum oxide, titanium oxide, aluminum silicate, silicon oxide, gypsum, novaculite, dawsonite, or white clay), a UV absorber (resorcinol, salicylate, benzotriazole, benzophenone and the like), a heat stabilizer (hindered phenol, hydroquinone, phosphites and substituted bodies thereof, including the aforementioned stabilizer), a lubricant, a releasing agent (montanic acid, and a salt thereof, an ester thereof, and a half ester thereof, stearyl alcohol, stearamide and polyethylene wax), a colorant including a dye (nigrosine and the like) and a pigment (cadmium sulfide, phthalocyanine and the like), a anticoloring agent (phosphite, hypophosphate and the like), a flame retardant (red phosphorus, phosphoric acid ester, brominated polystyrene, brominated polyphenylene ether, brominated polycarbonate, magnesium hydroxide, melamine and cyanuric acid or a salt thereof), an electrically conducting agent or coloring agent (carbon black and the like), a tripological property improving agent (graphite, fluorine resin and the like), a nucleating agent (an inorganic nucleating agent such as talc, an organic amide compound such as ethylenebislauric acid amide, ethylene bis-12-dihydroxystearic acid amide and trimellitic acid tricyclohexylamide, a pigment-based nucleating agent such as copper phthalocyanine and Pigment Yellow 110, an organic carboxylic acid metal salt and the like), and an antistatic agent.

In addition, the aliphatic polyester resin composition can further contain at least one or more kinds of other thermoplastic resin (e.g., polyethylene, polypropylene, acryl resin, polyamide, polyphenylene sulfide resin, polyether ether ketone resin, polyester, polysulfone, polyphenylene oxide, polyacetal, polyimide, polyetherimide and the like) or an thermosetting resin (e.g., phenol resin, melamine resin, polyester resin, silicone resin, epoxy resin and the like) or a soft thermoplastic resin (e.g., ethylene/glycidyl methacrylate copolymer, polyester elastomer, polyamide elastomer, ethylene/propylene terpolymer, ethylene/butane-1 copolymer and the like) in such a range that the object of this disclosure is not deteriorated.

The aliphatic polyester resin composition has a high molecular weight after once it is heat-melted and solidified upon processing into a molded article and, in a preferable aspect, the aliphatic polyester resin composition having a high melting point, and excellent thermal stability and hue is easily formed.

The aliphatic polyester resin composition obtained by the method for production can be widely used as a molded article. Examples of the molded article include films, sheets, fibers fabrics, non-woven fabrics, injection-molded articles, extrusion-molded articles, vacuum pressure-formed molded articles, blow-molded articles, and composites with other materials, and these molded articles are useful in agricultural materials, gardening materials, fishing materials, civil engineering construction materials, stationary, medical products, automobile parts, electric and electronic parts or other utilities.

EXAMPLES

Our methods and compositions are described in detail with reference to the following example, but the content is not limited by them. Herein, part(s) in Examples indicates part(s) by weight.

A measurement method and a determination method will be shown below.

<1> Examples 1 to 16, Comparative Examples 1 to 5

A measurement method and a determination method used in Examples 1 to 16, and Comparative Examples 1 to 5 are shown below.

(1) Weight Average Molecular Weight (Mw)

A weight average molecular weight is a value of a weight average molecular weight calculated as standard polymethyl methacrylate as measured by gel permeation chromatography (GPC) manufactured by Waters using hexafluoroisopropanol as a solvent.

(2) Melting Point

A sample was held at 200° C. for 2 minutes under nitrogen atmosphere and was cooled to 30° C. at 120° C./min, thereafter, the sample was heated to 200° C. at a heating rate of 20° C./min, and a melting point was measured with a differential scanning calorimeter (DSC) DSC7 manufactured by Perkin Elmer.

(3) Amount of D Isomer

A polymer was hydrolyzed under a sodium hydroxide solution, thereafter, this was neutralized with hydrochloric acid and, then, a amount of D isomer was measured by liquid chromatography equipped with an optical isomer separation column.

(4) Thermal Stability

A sample was held at 200° C. for 20 minutes under a nitrogen stream, and a weight retention and a weight loss rate were measured with a thermogravimetric analyzer (TGA) manufactured by Perkin Elmer. It can be said that as the weight retention is larger, thermal stability is better. Herein, 100—weight retention is a weight loss rate.

(5) Hydrolysis Resistance

Wet heat treatment was performed for 24 hours under the condition of a temperature of 60° C. and a relative humidity of 95% in a temperature & humidity chamber manufactured by Espec, and a molecular weight retention from a weight average molecular weight before and after treatment was measured.

(6) Hue

A hue was determined using the following criteria by visual observation:

5: Non-colored
4: Intermediate between 3 and 5
3: Colored yellow
2: Intermediate between 1 and 3
1: Colored brown.

(7) Content of Sulfonic Acid Group-Containing Compound (Content of Sulfur Atom)

Using an automatic combustion instrument manufactured by Mitsubishi Chemical Corporation, a sample was heated at 900 to 1000° C. in a sealed system (Ar/oxygen), a gas generated upon ashing was absorbed in an absorbing solution (90 ppm-hydrogen peroxide solution) at a constant volume, and the content was quantitated.

Example 1

One hundred parts of 90% L-lactic acid (D isomer amount 0.4%) aqueous solution was fed into a reactor equipped with a mixer and a refluxing device, 1,3-propanedisulfonic acid as a catalyst was added so as to be 800 ppm calculated as sulfer atoms with respect to an L-lactic acid amount except for water, a temperature was raised to 150° C., a pressure was gradually reduced to 800 Pa, the reaction was continued for 3.5 hours while water was removed, and a polymerization was performed at a temperature of 170° C. and a pressure of 400 Pa for 6 hours to obtain a prepolymer. The resulting prepolymer was crushed, and subjected to crystallization at 110° C. for 1 hour under nitrogen atmosphere, and solid phase polymerization was performed at 140° C. for 3 hours, at 150° C. for 3 hours, and at 160° C. for 18 hours under a pressure of 50 Pa to obtain a polylactic acid-based resin. Properties of the resulting polylactic acid-based resin (composition) are shown in Table 1.

Examples 2 to 7, and Comparative Examples 1 to 5

The same procedure as that of Example 1 was conducted except that a kind and the addition amount of a catalyst used were as shown in Table 1 and Table 2. Results are shown in Table 1 and Table 2.

Example 8

100 parts by weight of the polylactic acid-based resin obtained in Example 1 was mixed 0.2 part by weight of pyrimidine which is a nitrogen-containing organic compound, the mixture was subjected to impregnation treatment while rotated at 140° C. and a atmospheric pressure under nitrogen atmosphere in a eggplant flask using an evaporator, and test of hydrolysis resistance was performed. Properties of the resulting polylactic acid-based resin (composition) are shown in Table 3.

Examples 9 to 10

The same procedure as that of Example 8 was conducted except that a kind and the addition amount of the nitrogen-containing organic compound used were as shown in Table 3. Results are shown in Table 3.

Examples 11 to 14

100 parts by weight of the polylactic acid-based resin obtained in Example 1 was mixed a kind shown in Table 3 of a nitrogen-containing organic compound, at the addition amount shown in Table 3, then, the materials were melt-kneaded at 190° C. using a biaxial extruder, and test of hydrolysis resistance was conducted. Results are shown in Table 3.

Examples 15 to 16

100 parts by weight of the polylactic acid-based resin obtained in Example 1 was mixed an alkaline earth metal shown in Table 3, at the addition amount shown in Table 3, then, materials were melt-kneaded at 190° C. using a biaxial extruder, and test of hydrolysis resistance was conducted. Results are shown in Table 3.

TABLE 1

| | Example | | | | | | |
|---|---|---|---|---|---|---|---|
| | 1 | 2 | 3 | 4 | 5 | 6 | 7 |
| Catalyst 1 | 1.3-Propane-disulfonic acid | 1.3-Propane-disulfonic acid | 1.3-Propane-disulfonic acid | 1,5-Naphthalene-disulfonic acid | Anthraquinone-2-sulfonic acid | 4,4'-Biphenyl-disulfonic acid | 1,3-Propane-disulfonic acid |
| Addition amount of catalyst 1 relative to monomer in terms of sulfur atom (ppm) | 800 | 420 | 2250 | 800 | 800 | 800 | 800 |

TABLE 1-continued

| Catalyst 1 | Example 1<br>1,3-Propane-disulfonic acid | Example 2<br>1,3-Propane-disulfonic acid | Example 3<br>1,3-Propane-disulfonic acid | Example 4<br>1,5-Naphthalene-disulfonic acid | Example 5<br>Anthraquinone-2-sulfonic acid | Example 6<br>4,4'-Biphenyl-disulfonic acid | Example 7<br>1,3-Propane-disulfonic acid |
|---|---|---|---|---|---|---|---|
| Addition amount of catalyst 1 relative to aliphatic polyester resin in terms of sulfur atom (ppm) | 1034 | 536 | 2847 | 1021 | 1023 | 1021 | 1025 |
| Catalyst 2 | None | None | None | None | None | None | Tin (II) acetate |
| Addition amount of catalyst 2 relative to raw materials monomer in terms of metal atom (ppm) | — | — | — | — | — | — | 370 |
| Weight average molecular weight (ten thousands) | 15 | 12 | 22 | 15 | 14 | 15 | 16 |
| Melting point (° C.) | 166 | 166 | 169 | 168 | 165 | 167 | 167 |
| D body amount (%) | 13.9 | 15.7 | 8.7 | 8.9 | 0.9 | 0.9 | 1 |
| Thermogravimetric retaining rate (%) | 99.7 | 99.8 | 99.5 | 99.3 | 99.5 | 99.6 | 94.5 |
| Wet heat molecular weight retaining rate (%) | 82 | 94 | 25 | 83 | 80 | 79 | 68 |
| Content of sulfonic acid group-containing compound relative to aliphatic polyester rein in terms of sulfur atom (ppm) | 1006 | 511 | 2802 | 989 | 997 | 995 | 994 |
| Remaining rate of sulfonic acid group-containing compound (%) | 97 | 95 | 98 | 97 | 93 | 97 | 97 |
| Melting point (° C.) | 5 | 5 | 4 | 5 | 5 | 5 | 4 |

TABLE 2

| Catalyst 1 | Comparative Example 1<br>Methanesulfonic acid | Comparative Example 2<br>p-toluenesulfonic acid | Comparative Example 3<br>Tin (II) chloride | Comparative Example 4<br>1,3-Propane-disulfonic acid | Comparative Example 5<br>1,3-Propane-disulfonic acid |
|---|---|---|---|---|---|
| Addition amount of catalyst 1 relative to monomer in terms of sulfur atom (ppm) | 800 | 800 | 370 | 150 | 3200 |
| Addition amount of catalyst 1 relative to aliphatic polyester resin in terms of sulfur atom (ppm) | 1028 | 1030 | 481 | 197 | 4115 |
| Catalyst 2 | None | None | None | None | None |
| Addition amount of catalyst 2 relative to raw materials monomer in terms of metal atom (ppm) | — | — | — | — | — |
| Weight average molecular weight (ten thousands) | 4 | 4 | 4 | 5 | 24 |
| Melting point (° C.) | 151 | 151 | 151 | 153 | 169 |
| D body amount (%) | 0.8 | 1.2 | 1.2 | 0.8 | 1.5 |
| Thermogravimetric retaining rate (%) | 99.4 | 99.7 | 93.1 | 99.8 | 95.4 |
| Wet heat molecular weight retaining rate (%) | 95 | 94 | 95 | 93 | 13 |
| Content of sulfonic acid group-containing compound relative to aliphatic polyester resin in terms of sulfur atom (ppm) | 120 | 150 | — | 175 | 4086 |
| Remaining rate of sulfonic acid group-containing compound (%) | 12 | 15 | — | 89 | 99 |
| Color tone | 5 | 4 | 5 | 5 | 1 |

TABLE 3

| Devitalizing agent | Example 8<br>Pryimidine | Example 9<br>Ethylene-diamine | Example 10<br>N,N,N-Trimethyl-ethylenediamine | Example 11<br>Didecylamine | Example 12<br>Didecylamine | Example 13<br>Didecylamine | Example 14<br>Dibenzylamine | Example 15<br>Magnesium stearate | Example 16<br>Calcium stearate |
|---|---|---|---|---|---|---|---|---|---|
| Addition amount of catalyst 1 relative to monomer in terms of sulfur atom (ppm) | 700 | 700 | 700 | 219 | 438 | 876 | 219 | 164 | 274 |

TABLE 3-continued

| | Example | | | | | | | | |
|---|---|---|---|---|---|---|---|---|---|
| Devitalizing agent | 8 Pryimidine | 9 Ethylene-diamine | 10 N,N,N-Trimethyl-ethylenediamine | 11 Didecylamine | 12 Didecylamine | 13 Didecylamine | 14 Dibenzylamine | 15 Magnesium stearate | 16 Calcium stearate |
| Wet heat molecular weight retaining rate (%) | 97 | 93 | 93 | 95 | 92 | 88 | 95 | 96 | 91 |
| Color tone | 5 | 4 | 4 | 5 | 5 | 4 | 4 | 5 | 5 |

<2> Examples 17 to 39, and Comparative Examples 6 to 10

A measurement method and a determination method used in Examples 17 to 39, and Comparative Examples 6 to 10 are shown below.
(1) Weight Average Molecular Weight (Mw)
A weight average molecular weight is a value of a weight average molecular weight calculated as standard polymethyl methacrylate as measured with gel permeation chromatography (GPS) LC solution manufactured by Shimadzu Corporation using chloroform as a solvent.
(2) Melting Point
A sample was held at 200° C. for 2 minutes, was cooled to 0° C. at 20° C./min, thereafter, the sample was heated to 200° C. at a heating rate of 20° C./min, and a melting point was measured with a differential scanning calorimeter (DSC) Q-100 manufactured by TA Instruments.
(3) Amount of D Isomer
A polymer was hydrolyzed under a sodium hydroxide solution, thereafter, this was neutralized with hydrochloric acid and, then, a amount of D isomer was measured by liquid chromatography equipped with an optical isomer separation column.
(4) Thermal Stability (Thermal Weight Loss Rate)
A sample was held at 200° C. in nitrogen 100 ml/min atmosphere, and a weight loss rate was measured with a thermogravimetric analyzer (TGA) manufactured by TA Instruments.
(5) Hydrolysis Resistance
A sample was subjected to wet heat treatment for 5 days under a temperature of 60° C. and a relative humidity 95% in a temperature & humidity chamber GL-04KA manufactured by Espec, and a molecular weight retention from a weight average molecular weight before and after treatment was measured.
(6) Hue
A color tone at melting was observed visually.
(7) Content of Sulfonic Acid Group-Containing Compound (Content of Sulfur Atom)
Using an automatic combustion instrument AQF-100 manufactured by Mitsubishi Chemical Corporation, a sample was heated at 900 to 1000° C. in a sealed system (Ar/oxygen), a gas generated upon ashing was absorbed in an absorbing solution (90 ppm-hydrogen peroxide solution) at a constant volume and, thereafter, the content was determined with ion chromatography ICS-2000 manufactured by Dionex.
(8) Content of Nitrogen Compound (Content of Nitrogen Atom)
Under the premise that a residual rate of a nitrogen compound was 100%, a content was calculated from the addition amount of a nitrogen compound and a yield of a polymer.

Example 17

200 g of 90 wt % L-lactic acid aqueous solution was fed into a 500 mL four-neck flask, and this flask was soaked in an oil bath. A mixer was attached to the flask, a thermocouple of a thermometer was inserted therein, a vacuum line and a nitrogen gas line were connected, reduction in a pressure and nitrogen gas introduction were repeated three times, the atmosphere was replaced with nitrogen, an oil bath temperature was raised to 120° C., and dehydration was initiated. A pressure in a system was reduced from a atmospheric pressure to 5 kPa over 60 minutes at initial dehydration, dehydration was performed at 5 kPa for 1.5 hours (total dehydration time is 2.5 hours), then, a pressure in a system was increased to a atmospheric pressure with a nitrogen gas, and 362.7 mg (the addition amount is 632 ppm with respect to a raw material L-lactic acid calculated as sulfer atoms) of 1,3-propanedisulfonic acid as a catalyst was added under nitrogen atmosphere. Subsequently, a temperature in a system was raised to 160° C., a pressure was reduced from a atmospheric pressure to 0.3 kPa over 2 hours, a pressure was retained at 0.3 kPa, a polymer was discharged after melt polymerization for 4 hours (total 6 hours), and cooled to obtain a polylactic acid prepolymer. The prepolymer was crystallized for 2 hours in a vacuum dryer at 100° C., and crushed after cooling to a ordinary temperature. Into a 1 L pear-shaped flask was placed 100 g of a crystallized prepolymer powder having a particle diameter of 100 to 250 μm, the flask was attached to a rotary evaporator, reduction in pressure and nitrogen gas introduction were repeated two times to replace the atmosphere with nitrogen, and a pressure was reduced to 0.2 kPa over 60 minutes. A pressure was retained at 0.2 kPa, an oil bath temperature was raised to 110° C. while the pear-shaped flask was soaked in an oil bath and rotated, the flask was retained for 2 hours, a temperature was raised to 158° C., and solid phase polymerization was performed for 24 hours. After cooled to a ordinary temperature, a nitrogen gas was introduced to return a pressure to a atmospheric pressure, to obtain a powdery aliphatic polyester resin. An apparent yield Y % during a process of dehydration and polymerization was 71%. Physical properties of the resulting aliphatic polyester resin (composition) are shown in Table 4.

Examples 18 to 22, and Comparative Examples 6 to 9

The same procedure as that of Example 17 was conducted expect that a kind and the addition amount of a catalyst used, and melt polymerization condition were as shown in Table 4. Results are shown in Table 4.

Examples 23 to 26

The same procedure as that of Example 17 was conducted except that a kind and the addition amount of a monomer used, a kind and the addition amount of a catalyst, a kind and an amount of talc and an antioxidant, dehydration condition, melt polymerization condition, and solid phase polymerization condition were as shown in Table 5. Results are shown in Table 5.

TABLE 4

| | Example | | | | | |
|---|---|---|---|---|---|---|
| | 17 | 18 | 19 | 20 | 21 | 22 |
| Catalyst 1 | 1,3-Propane-disulfonic acid | 1,4-Butane-disulfonic acid | 1,6-Hexane-disulfonic acid | 1,3-Benzene-disulfonic acid | 1,5-Naphthalene-disulfonic acid | 1,8-Dihydroxy-naphthalene-3,6-disulfonic acid |
| Addition amount (mg) | 362.7 | 387.6 | 437.3 | 423 | 320 | 356 |
| Addition amount of sulfonic acid group-containing compound relative to raw material monomer in terms of sulfur atom (ppm) | 632 | 632 | 632 | 632 | 395 | 395 |
| Catalyst 2 | None | None | None | None | None | None |
| Addition amount (mg) | — | — | — | — | — | — |
| Condition of melting polymerization (temperature, time) | 160° C., 6 h | 150° C., 6 h | 150° C., 6 h | 160° C., 6 h | 160° C., 6 h | 160° C., 6 h |
| Yield (%) | 71 | 69 | 71 | 72 | 71 | 70 |
| Weight average molecular weight (ten thousands) | 20.7 | 17.7 | 18.7 | 17.7 | 19.7 | 19.5 |
| Melting point (° C.) | 170 | 169 | 168 | 170 | 170 | 170 |
| Color tone | Colorless transparent | Colorless transparent | Colorless transparent | Colorless transparent | Colorless transparent | Colorless transparent |
| Thermogravimetric decrease rate (wt %/min) | 0.02 | 0.02 | 0.07 | 0.02 | 0.03 | 0.02 |
| Content of sulfonic acid group-containing compound relative to aliphatic polyester resin in terms of sulfur atom (ppm) | 889 | 908 | 889 | 883 | 552 | 562 |
| Remaining rate of sulfonic acid group-containing compound (%) | 100 | 99 | 100 | 100 | 99 | 99 |
| Content of metal ion (ppm) | — | — | — | — | — | — |

| | Comparative Example | | | |
|---|---|---|---|---|
| | 6 | 7 | 8 | 9 |
| Catalyst 1 | Methanesulfonic acid | p-toluenesulfonic acid | Methanesulfonic acid | p-toluenesulfonic acid |
| Addition amount (mg) | 338 | 612.3 | 338 | 612.3 |
| Addition amount of sulfonic acid group-containing compound relative to raw material monomer in terms of sulfur atom (ppm) | 632 | 632 | 632 | 632 |
| Catalyst 2 | Stannous acetate | Stannous acetate | None | None |
| Addition amount (mg) | 107.7 | 107.7 | — | — |
| Condition of melting polymerization (temperature, time) | 160° C., 6 h | 160° C., 6 h | 160° C., 10 h | 160° C., 10 h |
| Yield (%) | 71 | 72 | 70 | 73 |
| Weight average molecular weight (ten thousands) | 13.9 | 15.7 | 8.7 | 8.9 |
| Melting point (° C.) | 167 | 167 | 166 | 165 |
| Color tone | Slightly yellow, cloudy | Colorless, slightly cloudy | Colorless transparent | Colorless transparent |
| Thermogravimetric decrease rate (wt %/min) | 1.58 | 1.47 | 0.05 | 0.07 |
| Content of sulfonic acid group-containing compound relative to aliphatic polyester resin in terms of sulfur atom (ppm) | 124 | 184 | 99 | 147 |
| Remaining rate of sulfonic acid group-containing compound (%) | 14 | 21 | 11 | 17 |
| Content of metal ion (ppm) | 469 | 461 | — | — |

TABLE 5

| | Example | | | |
|---|---|---|---|---|
| | 23 | 24 | 25 | 26 |
| Monomer 1 | 12° C. 5 kPa, 2.5 h | 120° C. 5 kPa, 2.5 h | 12° C. 5 kPa, 2.5 h | 90 wt % L-lactic acid 200 g |
| Weight (g) | 192 | 192 | 180 | 200 |
| Monomer 2 | Glycolic acid 3.04 g | Dimethyl terephthalate | — | — |
| Weight (g) | 3.04 | 7.767 | — | — |
| Monomer 3 | — | Ethylene glycol | — | — |
| Weight (g) | — | 2.483 | — | — |
| Talc addition amount (g) | — | — | — | 0.8 |

TABLE 5-continued

| | Example | | | |
|---|---|---|---|---|
| | 23 | 24 | 25 | 26 |
| Antioxidant (IR-1010) addition amount (g) | — | — | — | 0.2 |
| Dehydration condition (temperature, pressure, time) | 120° C. 5 kPa, 2.5 h | 120° C. 5 kPa, 2.5 h | None | 120° C. 5 kPa, 7.5 h |
| Catalyst | 1,3-Propanedisulfonic acid | 1,3-Propanedisulfonic acid | 1,3-Propanedisulfonic acid | 1,3-Propanedisulfonic acid |
| Weight (g) | 221.4 | 230.5 | 362.7 | 362.7 |
| Addition amount of sulfonic acid group-containing compound relative to raw material monomer in terms of sulfur atom (ppm) | 395 | 395 | 632 | 632 |
| Condition of melt polymerization (temperature, pressure, time) | 160° C. 0.3 kPa, 6 h | 160° C. 0.3 kPa, 6 h | 170° C. 5 kPa, 2 h 200° C. 0.2 kPa, 4 h | 160° C. 0.3 kPa, 6 h |
| Condition of solid phase polymerization (temperature, pressure, time) | 155° C. 0.2 kPa, 24 h | 155° C. 0.2 kPa, 24 h | None | 158° C. 0.2 kPa, 24 h |
| Yield (%) | 70 | 75 | 68 | 71 |
| Weight average molecular weight (ten thousands) | 15.7 | 10.9 | 2.5 | 20.9 |
| Melting point (° C.) | 163 | 164 | 198 | 171 |
| Color tone | Colorless transparent | Colorless transparent | Colorless transparent | Colorless transparent |
| Thermogravimetric decrease rate (wt %/min) | 0.03 | 0.02 | — | 0.02 |
| Content of sulfonic acid group-containing compound relative to aliphatic polyester resin in terms of sulfur atom (ppm) | 887 | 889 | 890 | 892 |
| Remaining rate of sulfonic acid group-containing compound (%) | 100 | 100 | 100 | 100 |
| Content of metal ion (ppm) | — | — | — | — |

Example 27

200 g of 90 wt % L-lactic acid aqueous solution was fed into a 500 mL four-neck flask, and this flask was soaked in an oil bath. A stirrer was attached to this flask, a thermocouple of a thermometer was inserted therein, a vacuum line and a nitrogen gas line were connected, reduction in a pressure and nitrogen gas introduction were repeated three times, the atmosphere was replaced with nitrogen, an oil bath temperature was raised to 120° C. and dehydration was initiated. A pressure in a system was reduced from a atmospheric pressure to 5 kPa over 60 minutes at initial dehydration, dehydration was performed at 5 kPa for 1.5 hours (total dehydration time was 2.5 hours), then, a pressure in a system was increased to a atmospheric pressure with a nitrogen gas, and 226.4 mg (the addition amount is 395 ppm with respect to a monomer weight calculated as sulfer atoms) of 1,3-propanedisulfonic acid having 2 sulfonic acid groups in one molecule as a catalyst was added under nitrogen atmosphere. Subsequently, a temperature in a system was raised to 160° C., a pressure was reduced from a atmospheric pressure to 0.3 kPa over 2 hours, a pressure was retained at 0.3 kPa, a polymer was discharged after melt polymerization for 4 hours (a total is 6 hours), and was cooled to obtain a polylactic acid prepolymer. The prepolymer was crystallized for 2 hours in a vacuum dryer at 100° C., cooled to a ordinary temperature and crushed. 100 g of a crystallized prepolymer powder having a particle diameter of 100 to 250 μm was placed into a 1 L pear shaped flask, the flask was attached to a rotary evaporator, reduction in a pressure and nitrogen gas introduction were repeated two times to replace the atmosphere with nitrogen, and a pressure was reduced to 0.2 kPa over 60 minutes. A pressure was retained at 0.2 kPa, an oil bath temperature was raised to 110° C. while the pear-shaped flask was soaked in an oil bath, and rotated, a temperature was retained for 2 hours, a temperature was further raised to 155° C., and solid phase polymerization was performed for 24 hours. After cooled to a ordinary temperature, a nitrogen gas was introduced to return to a atmospheric pressure, 280.5 mg of 2-amino-4-methoxy-6-methylpyrimidine was placed into the pear-shaped flask, the pear-shaped flask was soaked in a silicone oil bath at 180° C. for 30 minutes, and cooled to obtain a polylactic acid-based resin. An apparent yield Y % during a process of dehydration and polymerization was 70%. Physical properties of the resulting polylactic acid-based resin (composition) are shown in Table 6.

Example 28

A polymer was synthesized according to the same manner as that of Example 27 except that a kind and the addition amount of a catalyst used, dehydration condition, melt polymerization condition, and solid phase polymerization condition were as shown in Table 5. Thereupon, in the solid phase polymerization, 20 g of a prepolymer having a particle diameter of 1 to 3 mm was placed into a stainless pipe (internal diameter 2 cm, length 10 cm), a heated nitrogen gas (100 L/h) was introduced through a bottom of the pipe, and the pipe and a pipe for heating nitrogen were placed into an oil bath. Then, 10 g of the resulting polymer, 9.6 mg of pyrimidine, and 10.9 mg of methylimidazole were pre-mixed with a high speed mixer for 50 minutes, and this mixture was placed into a biaxial kneader to pelletize. In addition, setting of a temperature of the kneader was such that a raw material placement part was 120° C., a mixing part was 175° C., a melting part was 180° C., and a head part was 175° C. Results are shown in Table 6.

Example 29

A polymer was synthesized according to the same manner as that of Example 27 except that a kind and the addition amount of a catalyst used, dehydration condition, melt polymerization condition, and solid phase polymerization condition were as shown in Table 6, this was melted at 175° C., a nitrogen-containing compound was added, and the mixture was stirred for 30 minutes and cooled. Results are shown in Table 5.

Examples 30, and 35 to 38

The same procedure as that of Example 27 was conducted except that a kind and the addition amount of a catalyst used, dehydration condition, melt polymerization condition, and solid phase polymerization condition were as shown in Table 6 and, further, a nitrogen compound together with a catalyst was added to the melted dehydration reaction product. Results are shown in Table 6.

Example 31

A polymer was synthesized according to the same manner as that of Example 27 except that a kind and the addition amount of a catalyst used, dehydration condition, melt polymerization condition, and solid phase polymerization condition were as shown in Table 6. 10 g of the polymer and a nitrogen-containing compound were placed into a pear-shaped flask, and the pear-shaped flask was soaked in an oil bath at 180° C. for 30 minutes, taken out and cooled. Results are shown in Table 6.

Example 32

The same procedure as that of Example 27 was conducted except that a kind and the addition amount of a catalyst used, dehydration condition, melt polymerization condition, and solid phase polymerization condition were as shown in Table 6. Results are shown in Table 6.

Examples 33 and 34

A polymer was synthesized according to the same manner as that of Example of 27 except that a kind and the addition amount of a catalyst used, dehydration condition, melt polymerization condition, and solid phase polymerization condition were as shown in Table 6, 10 g of the polymer and a nitrogen-containing compound were placed into a glass tube, and the tube was sealed, and was allowed to stand in a constant temperature dryer at 180° C. for 30 minutes. Results are shown in Table 6.

Example 39, and Comparative Example 10

The same procedure as that of Example 27 was conducted except that a kind and the addition amount of a catalyst used, dehydration condition, melt polymerization condition, and solid phase polymerization condition were as shown in Table 6. Results are shown in Table 6.

TABLE 6

| | Example | | | | | | |
|---|---|---|---|---|---|---|---|
| | 27 | 28 | 29 | 30 | 31 | 32 | 33 |
| Dehydration condition (temperature, pressure, time) | 12° C., 5 kPa, 2.5 h | 120° C., 5 kPa, 2.5 h | None | 120° C., 5 kPa, 2.5 h | 120° C., 5 kPa, 2.5 h | 120° C., 5 kPa, 2.5 h | 120° C., 5 kPa, 2.5 h |
| Catalyst | 1,3-Propane-disulfonic acid | 1,3-Propane-disulfonic acid | 1,4-Butane-disulfonic acid | 1,3-Propane-disulfonic acid | 1,3-Propane-disulfonic acid | 1,3-Propane-disulfonic acid | 1,3-Propane-disulfonic acid |
| Weight (mg) | 226.4 | 363 | 387.9 | 181.3 | 363 | 363 | 363 |
| Addition amount of sulfonic acid group-containing compound relative to raw material monomer in terms of sulfur atom (ppm) | 395 | 632 | 632 | 316 | 632 | 632 | 632 |
| Condition of melt polymerization (temperature, pressure, time) | 160° C., 0.3 kPa, 6 h | 160° C., 101.3 kPa (Nitrogen), 6 h | 150° C., 5 kPa, 2 h | 160° C., 0.3 kPa, 6 h | 160° C., 0.3 kPa, 6 h | 160° C., 0.3 kPa, 6 h | 160° C., 0.2 kPa, 6 h |
| Condition of solid phase polymerization (temperature, pressure, time) | 155° C., 0.2 kPa, 24 h | 160° C., 101.3 kPa (Nitrogen), 20 h | 155° C., 0.2 kPa, 20 h | 158° C., 0.2 kPa, 24 h | 158° C., 0.2 kPa, 24 h | 158° C., 0.2 kPa, 24 h | 158° C., 0.2 kPa, 24 h |
| Yield (%) | 70 | 70 | 75 | 72 | 71 | 71 | 71 |
| Nitrogen-containing compound 1 | 2-Amino-4-methoxy-6-methylpyrimidine | Pyrimidine | Benzylamine | Dichloroaniline | 2-Amino-4-methoxy-6-methylpyrimidine | Pyrimidine | Pyrimidine |
| Weight (mg) | 280.5 | 9.6 | 353.4 | 601.4 | 85 | 1914.8 | 296.6 |
| Nitrogen-containing compound 2 | — | N-methylimidazole | Dibenzylamine | — | — | — | — |
| Weight (g) | — | 10.9 | 818 | — | — | — | — |
| Weight average molecular weight (ten thousands) | 15.8 | 19.7 | 22.4 | 16.9 | 24.6 | 23.2 | 21.2 |
| Melting point (° C.) | 167 | 170 | 170 | 169 | 171 | 170 | 170 |
| Color tone | Colorless transparent | Colorless transparent | Colorless transparent | Colorless transparent | Colorless transparent | Colorless transparent | Colorless transparent |
| Wet heat molecular weight retaining rate (%) | 82 | 78 | 71 | 53 | 80 | 81 | 89 |

TABLE 6-continued

|  |  |  |  |  |  |  |  |
|---|---|---|---|---|---|---|---|
| Thermogravimetric decrease rate (wt %/min) | 0.01 | 0.02 | 0.02 | 0.009 | 0.005 | 0.004 | 0.005 |
| Content of sulfonic acid group-containing compound relative to aliphatic polyester resin terms of sulfur atom (ppm) | 556 | 876 | 843 | 426 | 855 | 873 | 864 |
| Remaining rate of sulfonic acid group-containing compound (%) | 98 | 97 | 100 | 97 | 96 | 98 | 97 |
| Nitrogen content (ppm) | — | — | 772 | 401 | — | — | — |
| Molar ration of nitrogen and sulfur (N/S) | — | — | 2.1 | 2.15 | — | — | — |

|  | Example |  |  |  |  |  | Comparative Example |
|---|---|---|---|---|---|---|---|
|  | 34 | 35 | 36 | 37 | 38 | 39 | 10 |
| Dehydration condition (temperature, pressure, time) | 12° C., 5 kPa, 2.5 h | 120° C., 5 kPa, 2.5 h | 12° C., 5 kPa, 2.5 h | 120° C., 5 kPa, 2.5 h | 120° C., 5 kPa, 2.5 h | 120° C., 5 kPa, 2.5 h | 120° C., 5 kPa, 2.5 h |
| Catalyst | 1,3-Propane-disulfonic acid | 1,3-Propane-disulfonic acid | 1,3-Propane-disulfonic acid | Methane-disulfonic acid | Methane-disulfonic acid | 1,3-Propane-disulfonic acid | p-toluene-sulfonic acid |
| Weight (mg) | 363 | 363 | 363 | 313.1 | 313.1 | 363 | 612.3 |
| Addition amount of sulfonic acid group-containing compound relative to raw material monomer in terms of sulfur atom (ppm) | 632 | 632 | 632 | 632 | 632 | 632 | 632 |
| Condition of melt polymerization (temperature, pressure, time) | 160° C., 0.3 kPa, 6 h | 160° C., 0.3 kPa, 6 h | 160° C., 0.3 kPa, 6 h | 180° C., 0.1 kPa, 14 h | 170° C., 0.1 kPa, 10 h | 160° C., 0.2 kPa, 6 h | 160° C., 0.2 kPa, 6 h |
| Condition of solid phase polymerization (temperature, pressure, time) | 158° C., 0.2 kPa, 24 h | 158° C., 0.2 kPa, 24 h | 158° C., 0.2 kPa, 24 h | 158° C., 0.2 kPa, 24 h | 158° C., 0.2 kPa, 24 h | 158° C., 0.2 kPa, 24 h | 158° C., 0.2 kPa, 24 h |
| Yield (%) | 70 | 69 | 68 | 69 | 70 | 70 | 72 |
| Nitrogen-containing compound 1 | Pyrimidine | Diphenylamaine | 3-Amino-4-methylbenzamide | 2,5-Dichloroaniline | 2,5-Dichloroaniline | — | — |
| Weight (mg) | 493.7 | 597.5 | 244.2 | 1131.2 | 1523.8 | — | — |
| Nitrogen-containing compound 2 | — | — | 2-Amino-4-methylbenzonitrile | — | — | — | — |
| Weight (g) | — | — | 269.2 | — | — | — | — |
| Weight average molecular weight (ten thousands) | 20.9 | 17.2 | 15.3 | 12.9 | 15.7 | 19.5 | 7.5 |
| Melting point (° C.) | 170 | 167 | 167 | 167 | 168 | 170 | 164 |
| Color tone | Colorless transparent | Colorless transparent | Colorless transparent | Colorless transparent | Colorless transparent | Colorless transparent | Colorless transparent |
| Wet heat molecular weight retaining rate (%) | 70 | 66 | 71 | 85 | 81 | 35 | 58 |
| Thermogravimetric decrease rate (wt %/min) | 0.005 | 0.08 | 0.015 | 0.07 | 0.06 | 0.02 | 0.08 |
| Content of sulfonic acid group-containing compound relative to aliphatic polyester resin in terms of sulfur atom (ppm) | 863 | 897 | 911 | 495 | 596 | 890 | 130 |
| Remaining rate of sulfonic acid group-containing compound (%) | 97 | 98 | 98 | 54 | 66 | 100 | 15 |

TABLE 6-continued

| | | | | | | |
|---|---|---|---|---|---|---|
| Nitrogen content (ppm) | — | 398 | 838 | 787 | 1045 | — | — |
| Molar ration of nitrogen and sulfur (N/S) | — | 1.02 | 2.1 | 3.64 | 4.01 | — | — |

INDUSTRIAL APPLICABILITY

A method for effectively producing an aliphatic polyester resin having a high molecular weight and a high melting point, and excellent thermal stability and hue is provided, and the composition is useful as a raw material of fibers, films, and molded articles.

The invention claimed is:

1. A method for producing an aliphatic polyester resin using a sulfonic acid group-containing compound as a catalyst, comprising:
    melt polymerizing a raw material monomer, wherein an addition amount of the sulfonic acid group-containing compound during melt polymerization is 300 to 3000 ppm with respect to the raw material monomer calculated as sulfur atoms; and
    solid phase polymerizing a resulting melt polymer, wherein the content of the sulfonic acid group-containing compound after solid phase polymerization is 300 to 3000 ppm with respect to a produced aliphatic polyester resin calculated as sulfur atoms, and a residual rate of the sulfonic acid group-containing compound after solid phase polymerization is more than 50% wherein the melt polymerization is continuously performed under a condition including at least 2 stages, and the solid phase polymerization is continuously performed under the condition including at least the 2 stages:
    Melt polymerization: Condition 1 140° C. to 160° C., 13.3 to 66.6 kPa;
    Condition 2 160° C. to 180° C., 1.3 to 6.5 kPa,
    Solid phase polymerization: Condition 1 130° C. to 150° C.;
    Condition 2 higher than 150° C. to 165° C.

2. The method according to claim 1, wherein the content of the sulfonic acid group-containing compound after solid phase polymerization is 350 to 2500 ppm with respect to the produced aliphatic polyester resin calculated as sulfur atoms, and a residual rate of the sulfonic acid group-containing compound after solid phase polymerization is 80% or more.

3. The method according to claim 1, wherein the sulfonic acid group-containing compound has 2 or more sulfonic acid groups in one molecule.

4. The method according to claim 3, wherein the sulfonic acid group-containing compound having 2 or more sulfonic acid groups in one molecule is one or more kinds selected from the group consisting of methanedisulfonic acid, ethanedisulfonic acid, propanedisulfonic acid, butanedisulfonic acid, benzenedisulfonic acid, naphthalenedisulfonic acid, biphenyldisulfonic acid, phenoldisulfonic acid, catecholdisulfonic acid, benzidinedisulfonic acid, naphtholdisulfonic acid, and benzene-trisulfonic acid.

5. The method according to claim 1, wherein the sulfonic acid group-containing compound is added at any time from before initiation of melt polymerization to before completion of melt polymerization.

6. The method according to claim 1, wherein one or more kinds of compounds selected from the group consisting of a nitrogen-containing organic compound, an alkali metal compound, and an alkaline earth metal compound are further added.

7. The method according to claim 6, wherein the nitrogen-containing organic compound is one or more selected from the group consisting of an aromatic amine compound, an alkylamine compound having 4 or more carbon atoms, and a compound having a pyrimidine skeleton, the alkali metal compound is one or more kinds selected from an organic carboxylic acid alkali metal compound having 4 or more carbon atoms, and the alkaline earth metal compound is one or more kinds selected from the group consisting of an organic carboxylic acid alkaline earth metal compound having 4 or more carbon atoms.

8. The method according claim 6, wherein one or more compounds selected from the group consisting of the nitrogen-containing organic compound, the alkali metal compound and the alkaline earth metal compound are added after addition of the sulfonic acid group-containing compound.

9. The method according to claim 1, wherein one or more metal compounds selected from the group consisting of a tin compound, a titanium compound, a lead compound, a zinc compound, a cobalt compound, an iron compound, a lithium compound, and a rare earth compound are further added.

10. The method according to claim 9, wherein the ratio of a sulfur atom molar amount of the sulfonic acid group-containing compound with respect to a total metal molar amount of the tin compound, the titanium compound, the lead compound, the zinc compound, the cobalt compound, the iron compound, the lithium compound, and the rare earth compound after solid phase polymerization is 3.0 to 50.

11. The method according to claim 1, wherein a stabilizer is added at any time from before initiation of melt polymerization to after completion of solid phase polymerization.

12. The method according to claim 1, wherein each polymerization reaction of melt polymerization and solid phase polymerization is performed continuously.

13. The method according to claim 1, wherein the aliphatic polyester resin is a polylactic acid-based resin.

* * * * *